US012325550B2

(12) United States Patent
Bühler et al.

(10) Patent No.: US 12,325,550 B2
(45) Date of Patent: Jun. 10, 2025

(54) CLOSURE SYSTEM FOR CONTAINERS

(71) Applicant: RE-LID ENGINEERING AG, Ruggell (LI)

(72) Inventors: Alois Bühler, Triesen (LI); Christian Schandl, Wiener Neustadt (AT)

(73) Assignee: RE-LID ENGINEERING AG, Ruggell (LI)

( * ) Notice: Subject to any disclaimer, the term of this patent is extended or adjusted under 35 U.S.C. 154(b) by 0 days.

(21) Appl. No.: 18/536,743

(22) Filed: Dec. 12, 2023

(65) Prior Publication Data

US 2024/0116670 A1 Apr. 11, 2024

Related U.S. Application Data

(63) Continuation of application No. 17/309,758, filed as application No. PCT/EP2019/085378 on Dec. 16, 2019, now Pat. No. 11,884,445.

(30) Foreign Application Priority Data

Dec. 17, 2018 (EP) ..................................... 18212937

(51) Int. Cl.
*B65D 17/50* (2006.01)
*B65D 47/28* (2006.01)

(52) U.S. Cl.
CPC .......... *B65D 17/506* (2013.01); *B65D 47/286* (2013.01); *B65D 2401/15* (2020.05);
(Continued)

(58) Field of Classification Search
CPC ........................... B65D 17/506; B65D 47/286; B65D 2401/15; B65D 2517/0046;
(Continued)

(56) References Cited

U.S. PATENT DOCUMENTS 2,302,972 A 11/1942 Nuckols
2,429,984 A 11/1947 Berglund
(Continued)

FOREIGN PATENT DOCUMENTS

CA 2715812 C 5/2014
CA 2810107 C 12/2015
(Continued)

OTHER PUBLICATIONS

Office Action in Chinese application No. 201980083494.5 dated Oct. 25, 2022.
(Continued)

*Primary Examiner* — Kareen K Thomas
(74) *Attorney, Agent, or Firm* — Westman, Champlin & Koehler, P.A.

(57) ABSTRACT

A closure system for a container for liquids or bulk material includes a lid having an upper side, a lower side and a drinking orifice, a closure member for closing the drinking orifice that is positioned at a lower side of the lid and configured to cover an entire surface of the drinking orifice in a closed position, an operating member for manually opening the drinking orifice by a user positioned at the upper side of the lid and connected to the operating member, and at least one recess defined in the lid and disposed relative to the closure member such that, when the closure member is moved from the closed position via the operating member, the at least one recess is at least partially overlapped by the closure member such that a gas exchange occurs between an interior of the container and an environment.

33 Claims, 16 Drawing Sheets

(52) U.S. Cl.
CPC ............... *B65D 2517/0046* (2013.01); *B65D 2517/0091* (2013.01)

(58) Field of Classification Search
CPC ........ B65D 2517/0091; B65D 2205/00; B65D 53/02; B65D 85/72; B65D 2205/02; Y02W 30/80
See application file for complete search history.

(56) References Cited

U.S. PATENT DOCUMENTS

| | | | |
|---|---|---|---|
| 3,250,425 A * | 5/1966 | Nicholson | B65D 17/4012 |
| | | | D9/438 |
| 3,259,265 A | 7/1966 | Stuart | |
| 3,363,798 A | 1/1968 | Garangiotis | |
| 3,447,724 A | 6/1969 | Fiddyment | |
| 3,705,670 A | 12/1972 | Douty | |
| 3,705,671 A | 12/1972 | Douty | |
| 3,708,091 A | 1/1973 | Douty | |
| 3,717,276 A | 2/1973 | Luczak et al. | |
| 3,952,914 A | 4/1976 | Vogt | |
| 4,023,703 A | 5/1977 | Strobe et al. | |
| 4,077,538 A | 3/1978 | Waterbury | |
| 4,078,702 A | 3/1978 | Neff | |
| 4,099,642 A | 7/1978 | Nergard | |
| 4,127,212 A | 11/1978 | Waterbury | |
| 4,136,797 A | 1/1979 | Potts | |
| 4,162,742 A | 7/1979 | Vogt | |
| 4,170,724 A | 10/1979 | Waterbury | |
| 4,171,060 A | 10/1979 | Howard et al. | |
| 4,183,443 A | 1/1980 | DeParales et al. | |
| 4,190,174 A | 2/1980 | Haimowitz | |
| 4,215,794 A | 8/1980 | Lewis | |
| 4,234,099 A | 11/1980 | Tarro | |
| 4,339,053 A | 7/1982 | Tarro | |
| 4,361,249 A | 11/1982 | Tuneski et al. | |
| 4,407,424 A | 10/1983 | Heyn | |
| 4,433,792 A | 2/1984 | Mandel | |
| 4,442,950 A | 4/1984 | Wilson | |
| 4,463,866 A | 8/1984 | Mandel | |
| 4,489,018 A | 12/1984 | Ball | |
| 4,506,809 A | 3/1985 | Corsette | |
| 4,524,879 A | 6/1985 | Fundom et al. | |
| 4,541,541 A | 9/1985 | Hickman et al. | |
| 4,572,398 A | 2/1986 | Juty | |
| 4,576,306 A | 3/1986 | Kelsey et al. | |
| 4,580,692 A | 4/1986 | La Barge et al. | |
| 4,605,141 A | 8/1986 | Won | |
| 4,673,099 A | 6/1987 | Wells | |
| 4,681,238 A | 7/1987 | Sanchez | |
| 4,711,372 A | 12/1987 | Gach | |
| 4,746,032 A | 5/1988 | Huang | |
| 4,747,511 A | 5/1988 | Dutt et al. | |
| 4,749,099 A | 6/1988 | Davis et al. | |
| 4,784,283 A | 11/1988 | Cantu | |
| 4,842,159 A | 6/1989 | Heidrich | |
| 4,865,215 A | 9/1989 | Wells | |
| 4,877,129 A | 10/1989 | Wells | |
| 4,880,137 A | 11/1989 | Wells | |
| 5,080,249 A | 1/1992 | Shock | |
| 5,086,941 A | 2/1992 | English et al. | |
| 5,129,773 A | 7/1992 | Shock | |
| 5,242,075 A | 9/1993 | Ott et al. | |
| 5,285,924 A | 2/1994 | Morris | |
| 5,555,993 A | 9/1996 | Borkowski et al. | |
| 5,810,189 A | 9/1998 | Baker | |
| 5,813,559 A | 9/1998 | Cho | |
| 5,938,062 A | 8/1999 | Paramski | |
| 6,050,456 A | 4/2000 | Soper et al. | |
| 6,059,137 A | 5/2000 | Westwood et al. | |
| 6,279,769 B1 | 8/2001 | Duvander et al. | |
| 6,626,314 B1 | 9/2003 | McHenry et al. | |
| 6,732,875 B2 | 5/2004 | Smith et al. | |
| 6,763,963 B1 | 7/2004 | Martin | |
| D531,033 S | 10/2006 | Schmidtner et al. | |
| 7,152,753 B2 | 12/2006 | Huffman et al. | |
| 7,156,251 B2 | 1/2007 | Smith et al. | |
| 7,159,732 B2 | 1/2007 | Smith et al. | |
| D549,098 S | 8/2007 | Lohrman et al. | |
| 7,275,653 B2 | 10/2007 | Tedford, Jr. | |
| 7,500,577 B2 | 3/2009 | Wichelhaus | |
| 7,513,380 B2 | 4/2009 | Canedo | |
| D594,329 S | 6/2009 | McEldowney et al. | |
| D615,861 S | 5/2010 | Watts et al. | |
| 7,845,510 B2 | 12/2010 | Schmidtner et al. | |
| 7,850,037 B2 | 12/2010 | Schmidtner et al. | |
| 7,874,447 B2 | 1/2011 | Schmidtner et al. | |
| D632,562 S | 2/2011 | Toms | |
| 7,891,517 B2 | 2/2011 | Simmons | |
| 7,918,359 B2 | 4/2011 | Paris et al. | |
| 8,240,498 B2 | 8/2012 | Ramsey et al. | |
| 8,336,725 B2 | 12/2012 | Ramsey et al. | |
| 8,336,726 B2 | 12/2012 | Ramsey et al. | |
| 8,434,635 B2 | 5/2013 | Wichelhaus | |
| 8,469,218 B2 | 6/2013 | Bratsch | |
| 8,608,007 B2 | 12/2013 | Seo | |
| 8,720,740 B2 | 5/2014 | Bratsch | |
| D708,944 S | 7/2014 | van Goolen | |
| 8,794,469 B2 | 8/2014 | Bratsch | |
| 8,833,585 B2 | 9/2014 | Ramsey et al. | |
| 8,844,744 B2 | 9/2014 | Lucas | |
| 8,844,761 B2 | 9/2014 | Zabaleta et al. | |
| 8,857,644 B2 | 10/2014 | Phillips | |
| 8,931,656 B2 | 1/2015 | Ramsey et al. | |
| D722,266 S | 2/2015 | Abe | |
| 9,073,655 B2 | 7/2015 | Bratsch | |
| 9,162,796 B2 | 10/2015 | Bratsch | |
| D747,649 S | 1/2016 | Phillips | |
| 9,272,823 B2 | 3/2016 | Bratsch | |
| D762,116 S | 7/2016 | Prendergast-Kelly et al. | |
| 9,440,767 B2 | 9/2016 | Vanderstraeten | |
| 9,463,910 B2 | 10/2016 | Schandl | |
| 9,517,866 B2 | 12/2016 | Coffey et al. | |
| 9,878,833 B2 | 1/2018 | Phillips | |
| 9,938,052 B2 | 4/2018 | Dabbur | |
| D816,500 S | 5/2018 | Torrison et al. | |
| 9,963,281 B2 | 5/2018 | Bratsch | |
| D820,678 S | 6/2018 | Chapman et al. | |
| 10,124,942 B2 | 11/2018 | Seiders et al. | |
| 10,213,033 B2 | 2/2019 | Bratsch et al. | |
| 10,232,992 B2 | 3/2019 | Seiders et al. | |
| 10,273,063 B2 | 4/2019 | Schandl | |
| 10,392,158 B2 | 8/2019 | Bratsch et al. | |
| D859,155 S | 9/2019 | Reiley et al. | |
| 10,407,224 B2 | 9/2019 | Kleiner | |
| 10,781,012 B2 | 9/2020 | Bratsch | |
| 11,014,707 B2 | 5/2021 | Sanbar | |
| 2004/0065664 A1 | 4/2004 | Steadman | |
| 2006/0201944 A1 | 9/2006 | Shibasaka et al. | |
| 2006/0249511 A1 | 11/2006 | Yaffe et al. | |
| 2006/0289540 A1 | 12/2006 | Lee | |
| 2007/0012698 A1 | 1/2007 | Durdon et al. | |
| 2007/0068943 A1 | 3/2007 | Ramsey et al. | |
| 2008/0314904 A1 | 12/2008 | Perra | |
| 2009/0179033 A1 * | 7/2009 | Ramsey | B65D 17/506 |
| | | | 220/271 |
| 2009/0206083 A1 | 8/2009 | Heigl | |
| 2010/0038372 A1 | 2/2010 | Bratsch | |
| 2010/0126992 A1 | 5/2010 | Phillips | |
| 2010/0206875 A1 | 8/2010 | Bratsch | |
| 2011/0163096 A1 | 7/2011 | Wichelhaus | |
| 2012/0152949 A1 | 6/2012 | Bratsch | |
| 2012/0248113 A1 | 10/2012 | Majcen et al. | |
| 2013/0161325 A1 | 6/2013 | Vanderstraeten | |
| 2013/0228586 A1 | 9/2013 | Schandl | |
| 2013/0320013 A1 | 12/2013 | Bratsch | |
| 2014/0332548 A1 | 11/2014 | Bratsch et al. | |
| 2015/0375910 A1 | 12/2015 | Cohen Bissu | |
| 2016/0000246 A1 | 1/2016 | Vanderstraeten | |
| 2016/0221713 A1 | 8/2016 | Bratsch et al. | |
| 2016/0376077 A1 | 12/2016 | Schandl | |
| 2019/0240718 A1 | 8/2019 | Bratsch | |
| 2020/0055646 A1 | 2/2020 | Harris et al. | |

(56) References Cited

U.S. PATENT DOCUMENTS

| | | |
|---|---|---|
| 2022/0024638 A1 | 1/2022 | Schandl et al. |
| 2022/0033139 A1 | 2/2022 | Buhler et al. |
| 2024/0109685 A1 | 4/2024 | Schandl et al. |

FOREIGN PATENT DOCUMENTS

| | | |
|---|---|---|
| CA | 2856042 C | 6/2016 |
| CA | 2976440 C | 7/2019 |
| CN | 1863709 A | 11/2006 |
| CN | 101910010 A | 12/2010 |
| CN | 102015474 A | 4/2011 |
| CN | 102574616 A | 7/2012 |
| CN | 103167988 A | 6/2013 |
| CN | 103228552 A | 7/2013 |
| CN | 103946122 A | 7/2014 |
| CN | 105793165 A | 7/2016 |
| CN | 105916779 A | 8/2016 |
| CN | 106687381 A | 5/2017 |
| DE | 102008011919 A1 | 9/2009 |
| DE | 102010056552 A1 | 7/2012 |
| DE | 102012213093 A1 | 3/2014 |
| EP | 2426058 A1 | 3/2012 |
| EP | 2614010 B1 | 7/2013 |
| EP | 2555988 B1 | 6/2014 |
| EP | 2848547 A1 | 3/2015 |
| EP | 3303162 B1 | 8/2019 |
| JP | 2013539442 A | 10/2013 |
| MX | 2010009114 A | 11/2010 |
| MX | 2011005562 A | 6/2012 |
| WO | 2009049601 A1 | 4/2009 |
| WO | 2009062004 A1 | 5/2009 |
| WO | 2010000340 A1 | 1/2010 |
| WO | 2012028338 A1 | 3/2012 |
| WO | 2012028694 A1 | 3/2012 |
| WO | 2015185718 A1 | 12/2015 |
| WO | 2015185829 A1 | 12/2015 |
| WO | 2016130705 A1 | 8/2016 |
| WO | 2016172131 A1 | 10/2016 |
| WO | 2018068966 A1 | 4/2018 |
| WO | 2020086567 A1 | 4/2020 |
| WO | 2020126969 A1 | 6/2020 |
| WO | 2020127037 A1 | 6/2020 |

OTHER PUBLICATIONS

Office Action in Indian application No. 202117027000 dated Dec. 13, 2022.

Office Action in Chinese application No. 201980091865.4 dated Nov. 9, 2022.

Office Action in European application No. 18212937.9 dated Jul. 8, 2019.

Office Action in European application No. 18212937.9 dated May 26, 2020.

Office Action in Indian application No. 202117027002 dated Dec. 16, 2022.

Office Action in Russian application No. 2021121014 dated Dec. 7, 2021.

Office Action in Japanese Patent Application No. 2021-534718 dated Sep. 5, 2023.

Office Action in U.S. Appl. No. 17/309,666 dated Oct. 27, 2022.

Final Office Action in U.S. Appl. No. 17/309,666 dated Apr. 17, 2023.

Office Action in U.S. Appl. No. 17/309,758 dated Feb. 14, 2023.

International Search Report and Written Opinion in International application No. PCT/EP2019/085335 dated Jan. 29, 2020.

International Search Report and Written Opinion in International application No. PCT/EP2019/085378 dated Jan. 29, 2020.

Office Action in corresponding European Application No. 19818102.6 dated Oct. 17, 2024.

* cited by examiner

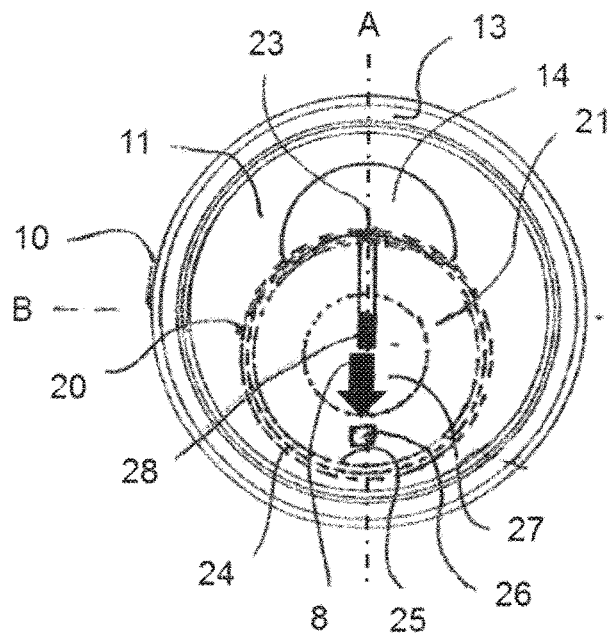 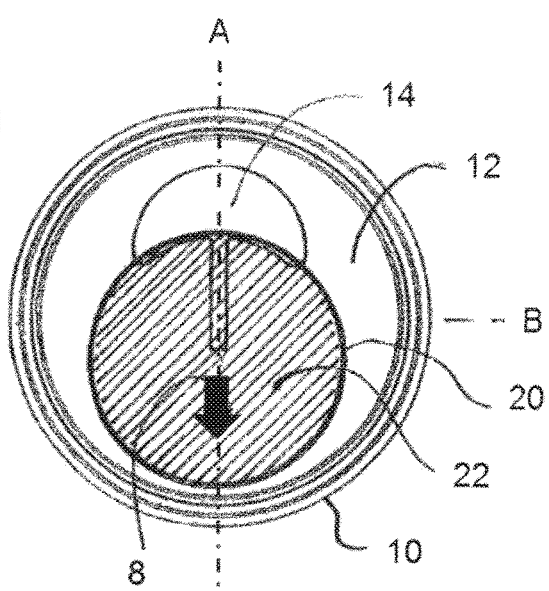
Fig. 10a    Fig. 10b
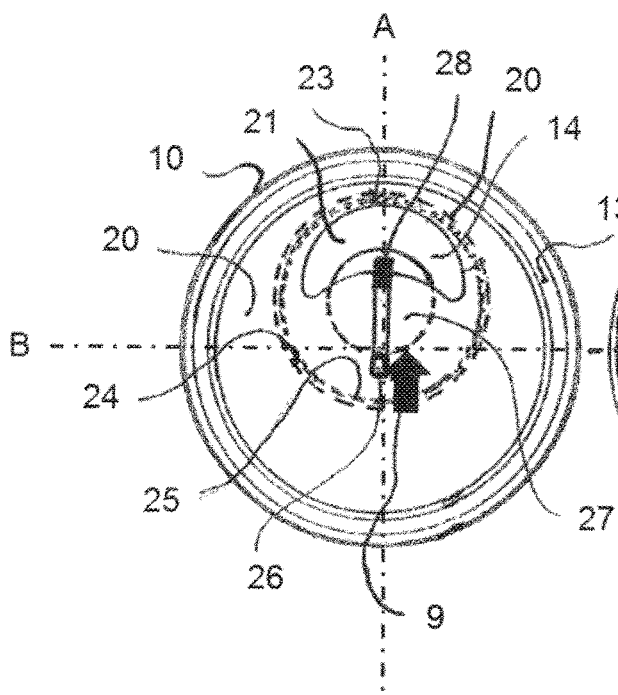 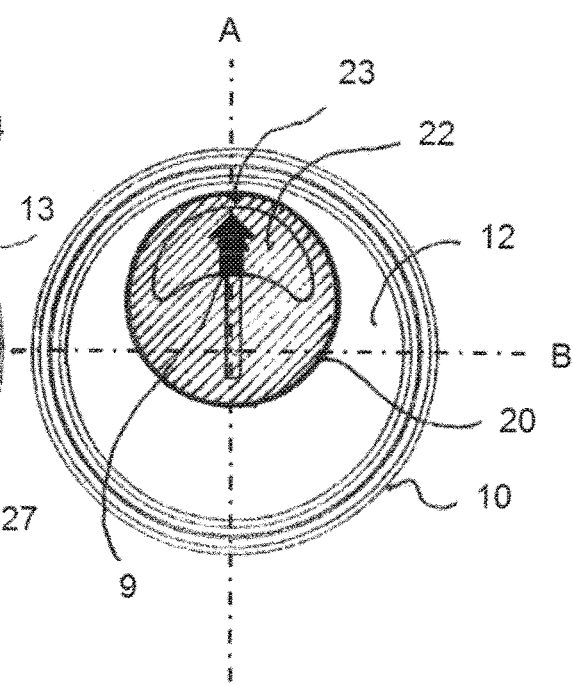
Fig. 11a    Fig. 11b

CLOSURE SYSTEM FOR CONTAINERS

CROSS-REFERENCE TO RELATED APPLICATION(S)

This application is a continuation of application Ser. No. 17/309,758, which was a Section 371 National Stage Application of International No. PCT/EP2019/085378, filed Dec. 16, 2019, and further claims priority to European Application Ser. No. 18212937.9, filed Dec. 17, 2018; those prior applications are each incorporated by reference herein in their entireties.

TECHNICAL FIELD

The present invention relates to a closure system for beverage containers, particularly beverage cans. In this context, the closure system according to the invention enables an opening and reclosing of the beverage container.

BACKGROUND

Beverage cans are among the most important commercial packaging for beverages. They are mainly used for carbonated beverages, particularly for beers, sodas and energy drinks, and usually have a resistance to an internal pressure of at least 6.2 bar. Beverage cans used nowadays usually consist of a one-piece, substantially cylindrical container made of aluminum or tinplate and a—usually folded—lid made of aluminum. To facilitate opening, the lid comprises a usually oval score line as well as a metal tab which is riveted on, which, when lifted, pushes the scored oval into the interior of the can by leverage, thus creating a drinking orifice. This built-in can opener is also known as a "stay on tab".

For consumers, the advantages of beverage cans are mainly their low tare weight, their infrangibility and the possibility to use them directly as a drinking vessel after opening. For beverage producers, the high barrier effect is an additional factor, as the neutrality of the material for flavors and the simultaneous light protection effect offer good protection even for sensitive products and enable high durability.

The main disadvantage of beverage cans with "stay on tabs" is the yet missing possibility to reclose them. It would thus be advantageous to provide a closure system by means of which the advantages of the well-known beverage cans may be combined with the possibility of reclosing them.

Document DE 10 2012 213 093 A1 discloses a recloseable closure system. Particularly in comparison with conventional "stay on tab" closures, the constructive effort is considerably higher on the one hand. On the other hand, a lid that is provided with such a closure system is notably lower, so that stackability of the lids is no longer guaranteed and special machines for connecting the lids with the cylindrical part of the can are required.

Disclosed embodiments of the invention provide an improved closure system for containers for liquids or bulk materials, particularly beverage cans or cardboard boxes, particularly wherein the container or the can, respectively, is recloseable in a simple manner.

Disclosed embodiments also provide such a closure system with a seal of warranty which renders unopened containers distinguishable from reclosed containers in a simple manner, particularly optically.

Disclosed embodiments also provide such a closure system which is particularly compact, in particular does not enlarge the outer dimensions of the container, and does not compromise stackability of the container.

Disclosed embodiments also provide such a closure system which may be produced with little constructive effort.

Disclosed embodiments also provide such a closure system that is configured for a pressure of at least 6.2 bar.

Disclosed embodiments also provide a can lid for a beverage can with such a closure system and a beverage can with such a closure system.

Disclosed embodiments also provide such a can lid with such a closure system, wherein the can lid and the remaining can body may be connected to form a beverage can by existing machines and processes.

Disclosed embodiments provide such a can lid and such a beverage can which are stackable, in particular wherein the closure system is flat to such a degree that the outer dimensions of the can lid or the beverage can, respectively, are not enlarged or their stackability is not compromised.

SUMMARY

A first aspect of the present invention relates to a closure system for a beverage container, e.g., a beverage can. The closure system comprises a closure member for closing a drinking orifice of a lid of the beverage container and an operating member for manually opening the drinking orifice by a user. In this context, the closure member may be positioned at a lower side of the lid and fixedly connected to the operating member on the upper side of the lid. For closing the drinking orifice, the closure system is configured to entirely cover the drinking orifice in a closed position. The operating member and the closure member are movably disposable along a first axis which extends substantially parallel to the upper side of the lid. In this context, a movement of the closure member from the closed position as well as opening of the drinking orifice may be caused by moving the operating member in a first direction along the first axis, and a movement of the closure member into the closed position as well as reclosure of the drinking orifice may be caused by moving the operating member in a second direction opposite the first direction along the first axis.

When joined together, the lid is also part of the closure member. In this embodiment, the closure member comprises said lid having an upper side, a lower side and a drinking orifice, and a closure member for closing the drinking orifice and a control member for manually opening the drinking orifice by a user. According to the invention, the closure member is then positioned at the lower side of the lid and is fixedly connected to the operating member at the upper side of the lid. For closing the drinking orifice, the closure member is configured to cover the entire surface of the drinking orifice in a closed position, and the operating member and the closure member are arranged to be movable along a first axis which is substantially parallel to the upper side of the lid. In this context, a movement of the operating member in a first direction along the first axis causes a movement of the closure member out of the closed position and opening of the drinking orifice, and a movement of the operating member in a second direction opposite to the first direction along the first axis causes a (back) movement of the closure member into the closed position and thus a reclosure of the drinking orifice.

According to an embodiment, the closure system comprises at least one securing and/or control member, wherein said control member is configured such that it comprises a first state as long as the operating member is not moved and/or the closure member is not moved from the closed position, and assumes a second state, which is at least optically distinguishable from the first state, if the operating member is moved into the first direction and/or if the closure member is moved from the closed position.

Such a securing member, which does not necessarily have to provide a control function, secures the operating member preferably against displacement.

In the case of a configuration as a control member, the second state may be assumed irreversibly. The control member retains the second state particularly even if the operating member is moved back into the second direction and/or if the closure system is moved back into the closed position.

Such a control member enables a user to identify whether the beverage container is still unopened or whether the closure system has already been used for opening and reclosing the container.

According to an embodiment, the control member comprises at least one control bar which is attached in a manner visible from the outside (i.e., for the user), wherein the control bar is disposed and configured such that it breaks if the operating member is moved into the first direction and/or if the closure member is moved from the closed position. In this context, the control bar(s) may comprise a predetermined breaking point.

In another embodiment, the control member is disposed and configured such that the movement of the operating member in the first direction causes a diverting movement of the control member, thus causing breaking of the at least one control bar.

In another embodiment, the control member is attached to the operating member by means of one or a plurality of crossbars (e.g., by at least two crossbars). Said crossbars preferably ensure movability of the control member about a tilting axis that is orthogonal to the first axis. In this context, the at least one control bar preferably extends along the first axis and may be attached both at the control member and the operating member. Furthermore, the control member is arranged at the operating member such that it collides with the lid if the operating member is moved in the first direction, wherein the diverting movement is entirely or partially caused by the collision, and wherein the diverting movement involves tilting of the control member around the tilting axis.

In this specific embodiment, the control bars accordingly break due to the tilting movement about an axis that is orthogonal to the orientation of the control bars.

Instead of the one or the plurality of crossbars, the securing and/or the control member may also be connected to the operating member by a hinge. The hinge may be provided by a notch in the operating member. The hinge preferably defines a tilting axis that is orthogonal to the first axis.

The securing or the control member may comprise one or a plurality of control bars which connect the securing or control member of the operating member to the handle and which are configured to break if the handle is lifted, thus rendering the lifting of the handle irreversibly visible.

According to another embodiment, the control member comprises an elevation on its lower side, said elevation being arranged such that it collides with the lid when the operating member is moved in the first direction. The elevation may be configured as a hook.

In doing so, the diverting movement is particularly at least partially caused by said collision. For instance, the elevation may abut the edge of the drinking orifice or the end of the guiding slot of the drinking orifice at the lid. Moreover, the closure member may comprise a recess, wherein the elevation extends into said recess.

In another embodiment, the operating member is configured integrally with the control member. In particular, this means that the control member is configured as an integral component of the operating member, and that it is made of the same material. For instance, the operating member and the control member may be made of aluminum.

In another embodiment, the control member is provided on the closure member. In the first state, it engages an orifice of the lid and is then visible from the outside by means of a viewing opening of the operating member. In particular, the control member may be configured and—relative to the orifice of the lid—positioned such that it breaks when the operating member is moved in the first direction, and/or if the closure member is moved from the closed position.

According to another embodiment of the closure system, the drinking orifice comprises a guide slot which runs along the first axis, and the operating member and/or the closure member comprise a guide member that engages the guide slot so that the operating member can move exclusively along the first axis. This guide member may also serve to, e.g., firmly connect the operating member and the closure member to one another. The guide slot and the drinking orifice may merge and/or be configured as a continuous common opening. The guide slot is optional.

Apart from the guide slot, the drinking orifice is preferably round, oval or crescent-shaped. According to another embodiment of the closure system, the closure member comprises at least one indentation which is arranged such that, during a movement of the closure member from the closed position, the opening of the drinking orifice initially occurs by the indentation. For this purpose, the indentation may be disposed, e.g., adjacent to an edge portion of the drinking orifice, particularly an edge portion of the drinking orifice which is initially uncovered during movement of the closure member from the closed position into the open position. The indentation may be disposed at the closure member such that it is positioned on the first axis if the closure member is in the closed position.

According to another embodiment of the closure system, the lid comprises an indentation or an opening on the first axis, and the closure system is configured to cover not only the drinking orifice but also the indentation and/or the orifice in the closed position. In this context, the indentation in the drinking orifice and/or the orifice next to the drinking orifice is disposed such that the indentation and/or orifice is opened prior to the drinking orifice during a movement of the closure member from the closed position. For this purpose, the indentation or opening may be arranged, e.g., adjacent to an edge portion of the drinking orifice, particularly to an edge portion of the drinking orifice which is initially uncovered during movement of the closure member from the closed position into the open position.

According to an embodiment, the lid comprises at least one recess which is arranged relative to the closed position of the closure member such that movement of the closure member from the closed position, i.e., particularly a movement into the first direction, causes the at least one recess to be entirely or partially covered by the closure member. In this context, the at least one recess may be embossed or punched—either into the upper side or the lower side of the lid.

In an embodiment, said at least one recess is arranged and the closure member is dimensioned such that, prior to opening the drinking orifice, the at least one recess is at least partially overlapped by the closure member when the closure member is moved from the closed position, thus allowing a gas exchange—i.e., between the upper and lower sides of the lid, i.e., the interior of the can and its environment—when the at least one recess is partially covered by the closure member, particularly if the drinking orifice (including the guide slot, if present) is at least partially overlapped by the closure member at the same time. The gas exchange particularly serves for equalizing an overpressure and/or underpressure within the beverage container.

In an embodiment, the at least one recess is arranged in the lower side of the lid, and the gas exchange takes place by passing through the at least one recess. The recesses may particularly be produced (e.g., embossed or punched) such that each recess corresponds to an elevation on the upper side of the lid.

In another embodiment, the at least one recess is disposed in the upper side of the lid such that an elevation corresponding to the recess is present on the lower side of the lid, wherein the closure member is distanced from the lower side of the lid by the elevation when the at least one recess is overlapped, and the gas exchange takes place bypassing the at least one elevation, e.g., in an interspace between two elevations.

According to another embodiment, a fixed connection of the closure member and the operating member is achieved by either a welded joint, an adhesive joint, a rivet joint or a snap-in connection. Preferably, only one single weld (particularly one single ultrasound or friction weld) is provided between the closure member and the operating member, or only one single rivet. In particular, preferably only one single weld (particularly one single ultrasound weld) is provided in the region of the joint between the fixing bolt of the closure member and the cavity of the operating member.

Such a fixed connection is preferably not variable and/or torque proof in length. In other words, the distance between the operating member and the closure member is preferably fixed and/or not variable in the region of the joint, and/or the two members may not be rotated towards one another.

In an embodiment of the closure system, the closure member comprises a fixing bolt and the operating member comprises a cavity, wherein the fixing bolt is inserted into the cavity for fixedly connecting the closure member and the operating member. In particular, the fixing bolt may comprise barbs for snapping in at the operating member, and/or engage in the guide slot of the drinking orifice that extends along the first axis.

According to another embodiment of the closure system, the operating member comprises a handle abutting the lid of the can, wherein the handle is preferably configured in a chamfered manner on its lower side and may be raised by at least 45°, particularly at least 90°, by means of a swiveling movement about a swivel axis orthogonal to the first axis. In particular, the swivel movement may take place in the direction of the second direction, i.e., opposite the opening direction, the operating member may be configured integrally with the handle, wherein on the upper side the operating member comprises a notch acting as a hinge and extending along the swivel axis, or the handle may be configured semi-annularly, wherein the handle may be disposed, e.g., around the control member.

According to another embodiment of the closure system, both the lid and the operating member are made of aluminum. Moreover, the closure member may also be made of aluminum.

According to another embodiment of the closure system, the closure member is adjusted to a shape of the lid with respect to its outer shape. In particular, the closure member may be oval or elliptical and comprise a length that is greater along a second axis orthogonal to the first axis than along the first axis.

A second aspect of the invention relates to a beverage container with a closure system according to the first aspect of the invention. In particular, the beverage container is a beverage can which comprises a substantially cylindrical body for receiving liquids, particularly carbonated liquids. In this context, the can may particularly be made from tinplate or aluminum. The lid of the closure system may be affixed to the can by means of a folded joint.

In the case of beverage cans known from the prior art, the closure system may particularly replace lids with stay on tabs.

The present summary is provided only by way of example, and not limitation. Other aspects of the present invention will be appreciated in view of the entirety of the present disclosure, including the entire text, claims and accompanying figures. The closure system and the beverage can according to the invention will be described in more detail below merely by way of example based on specific exemplary embodiments schematically illustrated in the drawings, wherein further advantages of the invention will also be elaborated on.

BRIEF DESCRIPTION OF THE DRAWINGS

FIGS. 10a-b show a closure member and lid after opening the drinking orifice;

FIGS. 11a-b show a closure member and lid in the closed position;

Figure 1:
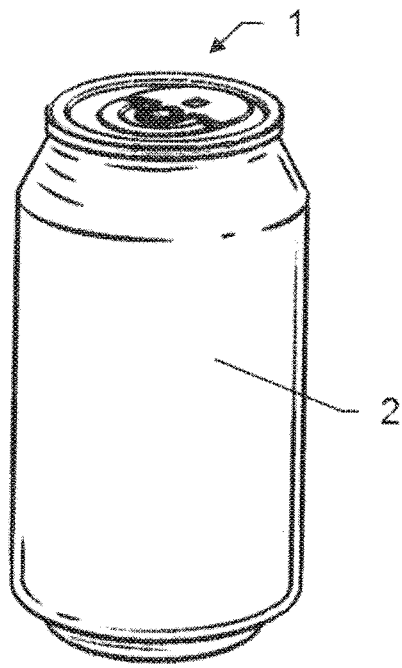
FIG. 1 shows a beverage can with an exemplary embodiment of the closure system according to the invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

FIG. 1 illustrates a beverage can 2 as an exemplary embodiment of a beverage container with a closure system 1 according to the invention.

The beverage can 2 shown in exemplary fashion may be used for all kinds of beverages, particularly for carbonated beverages such as beers, sodas and energy drinks. It has a resistance to internal pressure of at least 6.2 bar. It comprises a one-piece, substantially cylindrical container made of aluminum or tinplate and—as part of the closure system 1—a folded lid, e.g., made of aluminum. For folding purposes, e.g., a crimped edge of the can may be folded once and that of the lid may be folded twice, so that the folded joint resulting therefrom consists of a total of five form-fitting metal layers. Apart from beverage cans, the closure system 1 according to the invention may be used for other packaging types as well, e.g., for beverage cartons or bottles. The additional components of the closure system are fixed at the lid.

Figure 2:
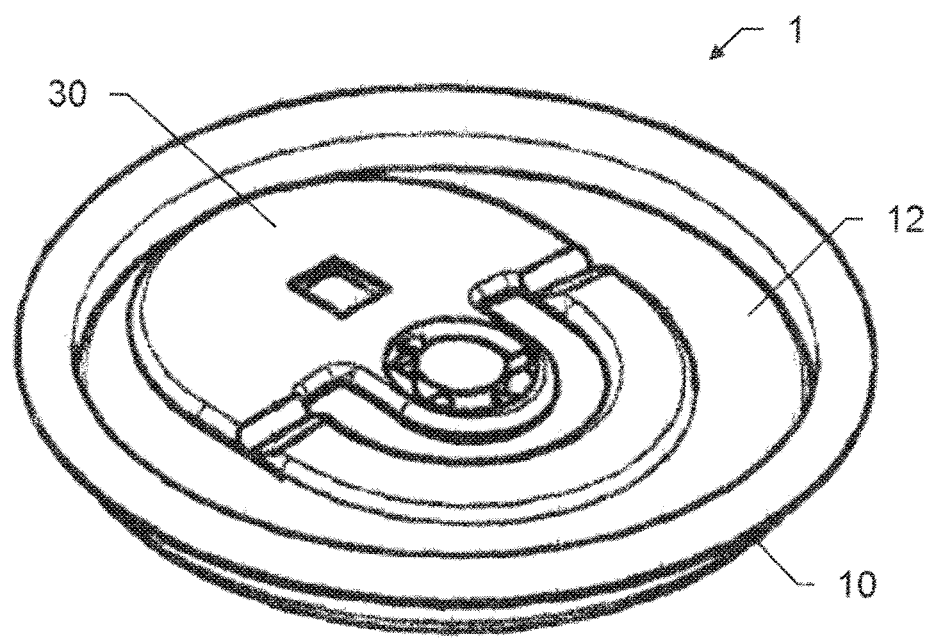
FIG. 2 shows a first embodiment of the closure system according to the invention.

FIG. 2 shows a first exemplary embodiment of the closure system 1 prior to attaching it to the beverage can 2 of FIG. 1. One the one hand, said closure system 1 comprises the lid 10 itself whose upper side 12 is visible here. On the other hand, an operating member 30 is shown, which is provided on the upper side 12 of the lid and allows for manually opening the can by a user.

Figure 3:
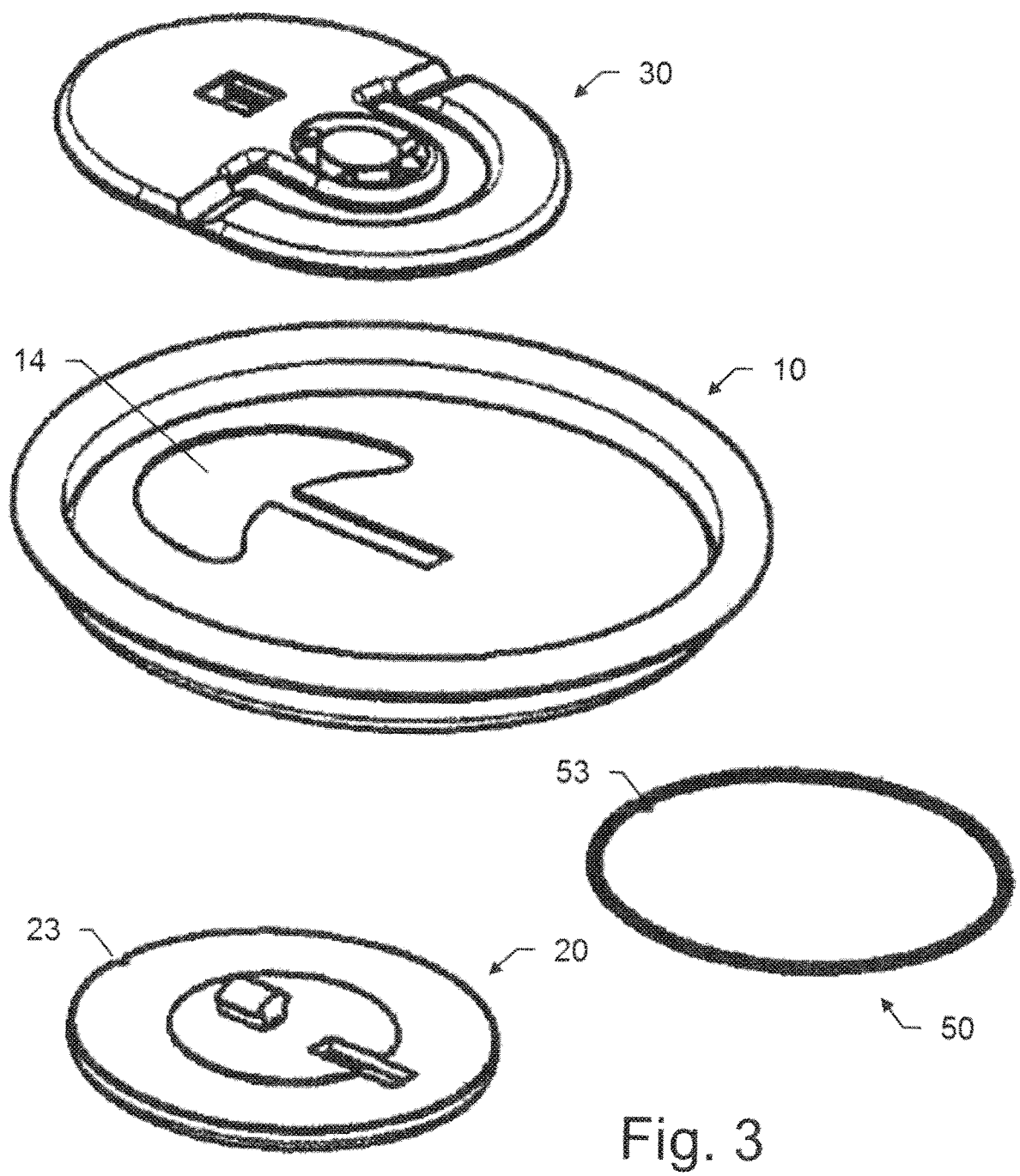
FIG. 3 shows the main components of the first embodiment of the closure system in an exploded view.

FIG. 3 shows the main components of the first embodiment of the closure system 1 in an exploded view. Said main components are the lid 10 with a drinking orifice 14, the operating member 30, and a closure member 20 for covering the drinking orifice 14 from the lower side of the lid.

On the one hand, the described closure system 1 may comprise the closure member 20 and the operating member 30 (and, if need be, the sealing ring 50), which are attached to each other around a suitable lid 10 before said lid is then joined together with a cylindrical body to form a can. On the other hand, the described closure system 1 may also comprise the lid 10 itself.

An optional sealing ring 50, which may, e.g., made of silicone or rubber and be attached to the closure member 20, is illustrated in addition. If the closure member, as is illustrated in the present case, comprises an indentation 23, the sealing ring may preferably be formed such that it comprises a notch 53 that corresponds to the shape of the indentation 23. Since the sealing ring 50 may come into contact with the beverage, it is preferably configured in a food safe manner and plasticizer-free manner. Optionally, it may comprise a hydrophobic surface.

The lid 10, the closure member 20 and the operating member 30 may be made of the same material, e.g., aluminum. The manufacture may take place using well-known processes, e.g., casting or punching. Particularly the closure member 20 and the operating member 30 may, however, also be made of nonmetallic materials such as plastics. Polycarbonate may particularly be used as a material; in doing so, the components may, e.g., be produced by means of injection molding. Optionally, the closure member 20 and the operating member 30 may be transparent.

The closure member 20 and the operating member 30 are configured such that they may be fixedly connected by means of the drinking orifice 14 after being joined together, e.g., by means of welding, bonding, barbs, or other mechanical processes.

Figure 4A:
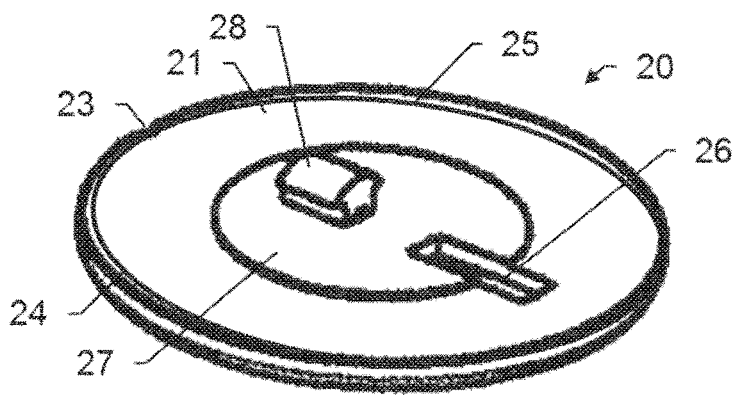
FIGS. 4a-d show a first exemplary embodiment of a closure member as part of the first embodiment of the closure system.
Figure 4B:
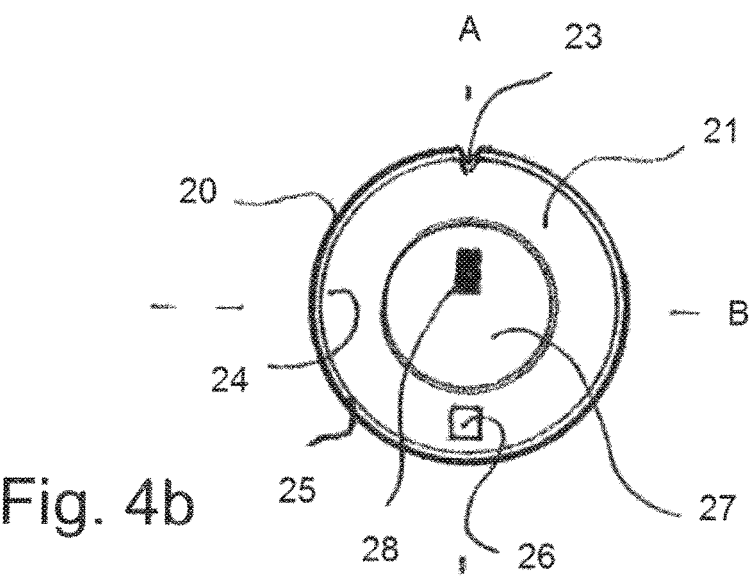
Figure 4C:
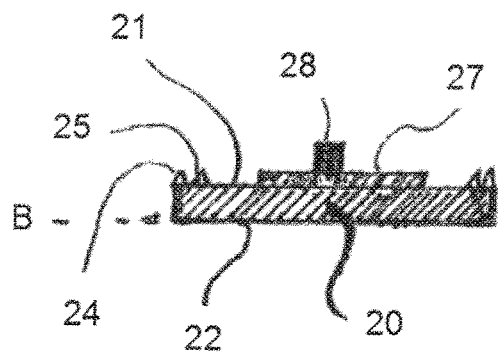
Figure 4D:
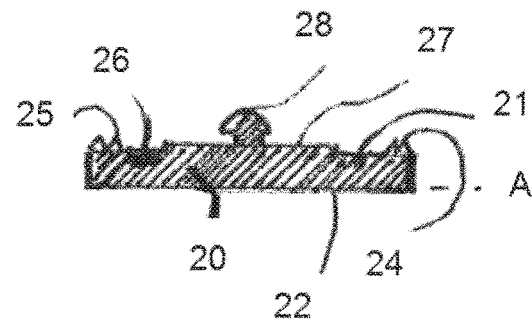

FIGS. 4*a* to 4*d* show a first embodiment of the closure member 20. FIG. 4*a* is a perspective view of the closure member 20, and FIG. 4*b* shows a top view of said same closure member 20. A recess 26 and a fixing bolt 28 are provided on the upper side 21 for connection with the operating member 30 (not illustrated here). An external seal 24 and an interior seal 25 are disposed concentrically and serve for sealing off against the lower side of the lid (not illustrated here). In this context, constant pressing of the seals 24 and 25 on the lower side of the lid allows for hermetic sealing. An optional, central elevation 27 allows for an equal distance between the lid on the one hand and the upper side of the closure member 20 and the lower side of the operating member on the other hand—particularly if the operating member is configured in a dished manner. In the embodiment shown, the closure member 20 comprises an indentation 23, the seals 24 and 25 being correspondingly indented as well. Indentation 23, fixing bolt 28 and recess 26 are arranged along a first axis A. A second axis B extends perpendicular thereto. FIG. 4*c* shows a sectional view of the closure member 20 along axis B, and FIG. 4*c* shows a sectional view along axis A. The lower side 22 of the closure member 20 facing the interior of the can is also illustrated. Optionally, a silicone or rubber sealing ring (cf. FIG. 3) may be provided at and/or between the seals 24 and 25.

The closure member 20 may be round, as illustrated, but may also have other shapes (e.g., semicircular or polygonal). For instance, the shape may at least partially be adjusted to the shape of the drinking orifice to be covered. In particular, the closure member 20 may be oval or elliptical. In order to ensure a complete opening movement of the closure member 20 in the direction of the first axis A, an oval or elliptical closure member is preferably broader along the second axis B than along the first axis A.

Figure 5A:
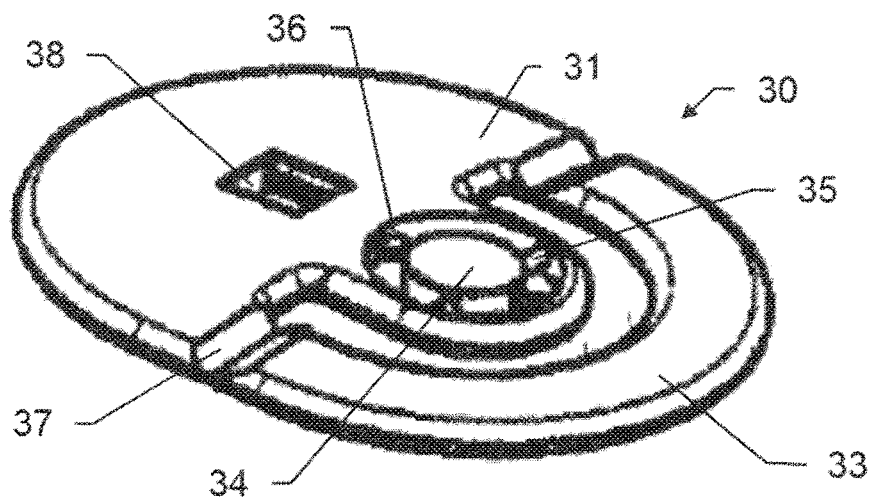
FIGS. 5a-c show a first exemplary embodiment of an operating member as part of the first embodiment of the closure system.
Figure 5B:
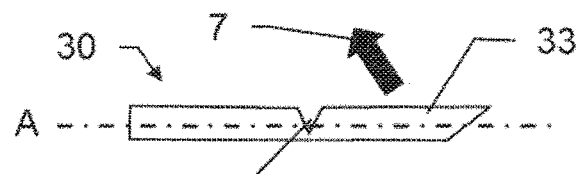

FIGS. 5*a* to 5*b* show a first embodiment of the operating member 30. FIG. 5*a* is a perspective view of the upper side 31 of the operating member 30. Together with the fixing bolt 28 of the closure member (not illustrated here), a cavity 38 serves for connection of these two elements. The cavity 38 may optionally comprise barbs which the fixing bolt 28 may snap in to. Alternatively or additionally, the fixing bolt 28 inserted into the cavity 38 may be attached by welding or adhesive bonding.

The operating member 30 comprises a securing or control member 34. In a configuration as control member 34, it may, as a kind of seal of quality, indicate the level of integrity of the can contents as long as the closure system has not been opened. When opened, such a control element 34 is irreversibly and visually changed. In particularly, this allows a user to identify in a simple manner whether the can is still in its original condition or whether it has already been opened and reclosed again. In the embodiment shown, the round control member 34 is connected to the main part of the control member 30 via two crossbars 35. It comprises two control bars 36 which are arranged orthogonally to the crossbars 35 and configured to break when the closure system is opened.

In the embodiment shown, the securing or control member 34, which may be configured in a round manner, is connected to the main part of the operating member 30 via two crossbars 35. It comprises two control bars 36 which are disposed orthogonal to the crossbars 35 and configured to break during opening of the closure system.

In this respect, the crossbars 35 are optional. Alternatively, the securing or control member 34 may be connected to the remaining operating member 30 by means of a hinge (not shown) as well.

Since the member 34 may also function as a securing only, the control bars 36 are optional as well.

Also shown is a handle 33 which is connected to the rest of the operating member 30 as a lug via a notch 37 acting as a hinge.

Figure 5C:
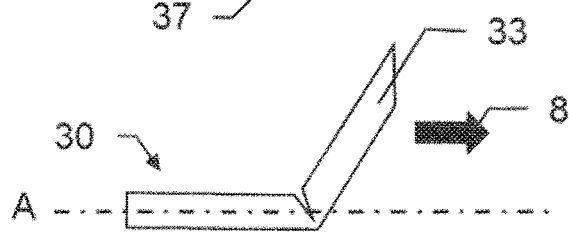

FIGS. 5b and 5c show a section through the operating member 30 and illustrate the use of the handle for opening the closure system. The handle 33 is preferably chamfered in order to make it easier for a user to grasp and pull up the handle abutting the can lid. A swiveling movement 7 of the handle 33 may occur around the hinge 37, preferably by up to 135°. With the help of the handle 33 lifted in this way, the operating member 30 may be moved out of its original closed position by a pull 8 on the handle along the axis A in order to open the can.

Figure 6A:
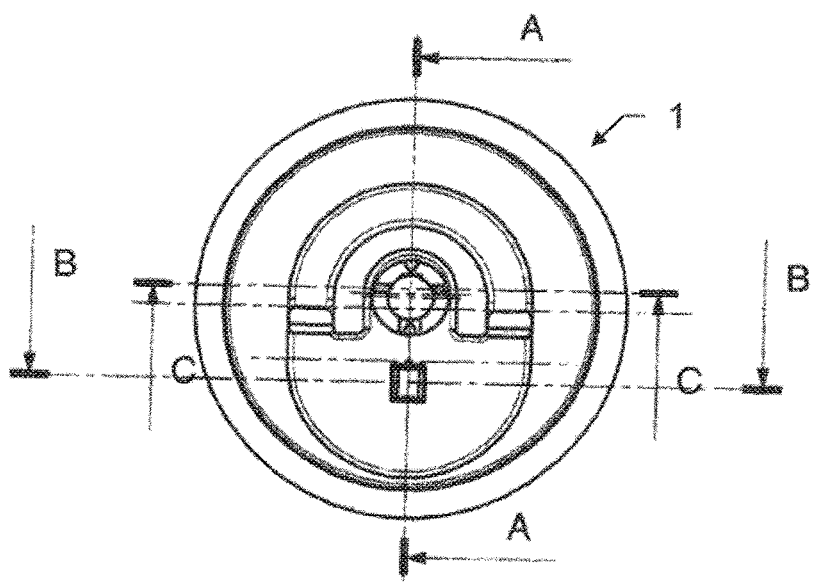
FIGS. 6a-d show a first embodiment of the closure system in a top view and in three sectional views.
Figure 6B:
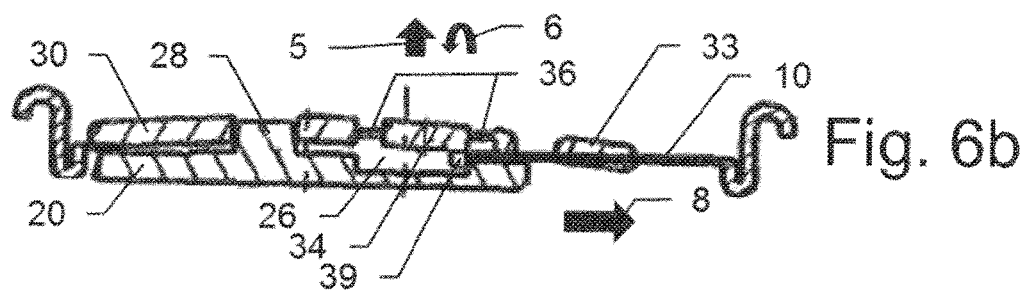
Figure 6C:
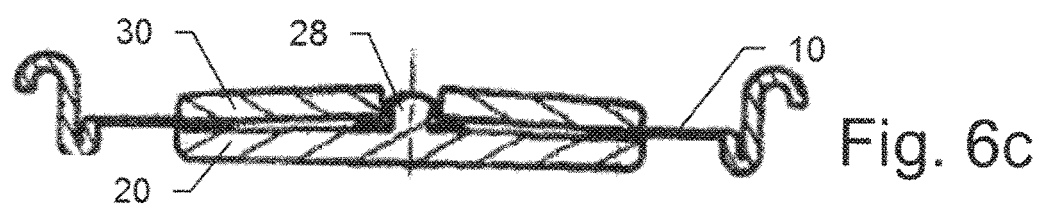
Figure 6D:
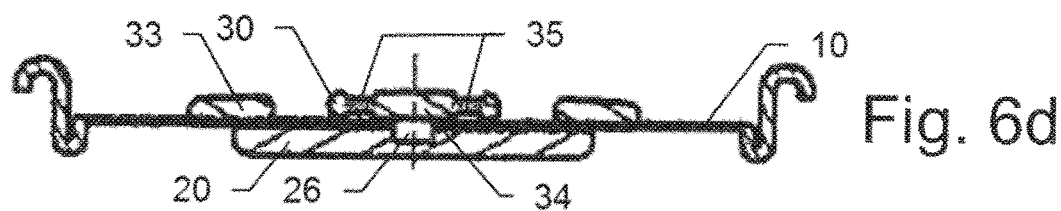

FIG. 6a shows the first embodiment of the closure system 1 in a top view. Three axes A, B and C are shown, wherein the first axis A extends along the direction of movement of the operating member and axes B and C extend orthogonally thereto. In doing so, axis B intersects axis A at the level of the fixing bolt 28 of the closure member and the cavity 38 of the operating member and axis C at the level of the control member 34 (cf. FIGS. 4a and 5a). FIGS. 6b, 6c and 6d each show a sectional view along one of these axes. In this context, FIG. 6b shows a section through the closure system 1 along the first axis A, FIG. 6c shows a section along axis B, and FIG. 6d shows a section along axis C.

As can be taken from FIGS. 6b-d, the operating member 30 is located above the lid 10 and the closure member 20 is located below the lid 10. The fixing bolt 28 engages through the drinking orifice of the lid into and provides (e.g., by catching, welding or adhesive bonding) a fixed, torsionally rigid connection of the operating member and the closure member. Alternatively, the operating and closure members may also be riveted. The operating member 30 may be configured in a dished manner.

The operating member 30 preferably acts as a disc spring which is supported in an outer region at the lid 10 and thus presses a central region of the actuating element away from the lid 10. In this way, the closure member 20, in particular its seal 24 and/or its seal 25, is preferably pressed against the lower side 12 of the lid 10. The central region may be recessed or concavely curved relative to the outer region, in particular upwardly. The actuating element may be supported on the upper side of the lid 10 via the outer region.

The control member 34 is located above the recess 26 of the closure member and is connected to the operating member at the crossbars 35. The control bars 36 connect the control member 34 to the operating member along the first axis A. On its lower side, the control member 34 comprises a conical elevation 39 which abuts the can lid 10 at the edge of the drinking orifice or at the end of a guide slot of the drinking orifice (cf. FIG. 7a).

In this context, the control member 34 and its elevation 39 are positioned and configured such that a movement of the operating member—which is necessary for opening the can—along the first axis A (opening movement 8) leads to a collision of the control member 34, i.e., the elevation 39, with the upper side of the can lid 10, wherein a diverting movement of the control member 34 occurs. An upward movement 5, a rotational movement 6 around axis C, or a combination of both movements 5, 6 may occur as a diverting movement of the control member 34, e.g., as a consequence of the attachment of the control member 34 by means of the optional crossbars 35. Such a diverting movement, which is inevitably triggered by the closure system when the can is opened, causes breaking of the control bars 36. According to this embodiment of the closure system according to the invention, it is therefore impossible to open the can without destroying the control bars.

The control bars 36 have a—particularly production-related—tolerance so that a certain force must be applied in order to break them and thus be able to open the can. The control member is then positioned and configured such that the opening movement 8 causes diverting movements 5, 6 which exceed said tolerance. Preferably, the control bars 36 may comprise predetermined breaking points. For this purpose, e.g., any of the control bars 36 may comprise a substantially triangular shape, wherein a corner of the triangle represents the connection with the control member 34 and (as the thinnest point of the control bar 36) serves as a predetermined breaking point at the same time.

Optionally, the lid 10 may be dished ("cambered") outwardly (or upwardly). In this case, the operating member 30 and/or the closure member 20 comprise a corresponding bulge, which preferably increases the sealing by the closure member 20.

As can be seen in FIGS. 6a-c, the closure system is dimensioned such that the stackability of a plurality of can lids provided with the closure system is not compromised. The stackability of a plurality of beverage cans provided with such can lids is compromised just as little. In particular, the operating member 30 and the closure member 20 are both configured in a sufficiently flat manner in order to ensure processing of the can lids (inclusive of the closure system) in existing machines and methods in which the lids are fixed onto the lids.

FIGS. 7a-b, 8a-b and 9a-b show various exemplary embodiments of the lid 10 and the drinking orifices 14, respectively.

Figure 7A:
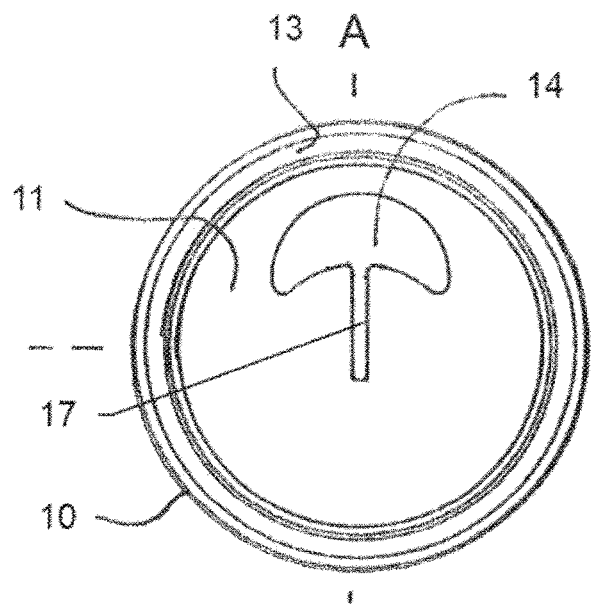
FIGS. 7a-b show a first exemplary embodiment of a can lid as part of a closure system according to the invention.
Figure 7B:
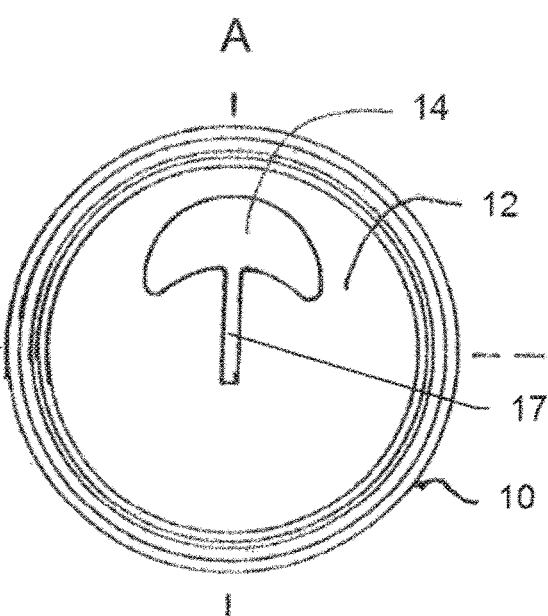

In this context, FIGS. 7a and 7b show a first embodiment. FIG. 7a shows the can lid 10 from above. It illustrates the upper side 11 of the lid with drinking orifice 14. The folded rim 13 for connecting the lid 10 with the can 2 (cf. FIG. 1) is circumferential to the upper side. The folded edge 13 is elevated relative to the upper side 11 of the lid (core depth).

FIG. 7b shows the lower side 12 of the same lid. The first embodiment of the lid 10 comprises a drinking orifice 14 with a guide slot 17 which extends along axis A and determines the movement directions for opening and reclosing the can. In particular, the fixing bolt of the closure member may engage into the guide slot 17 and be guided therealong when the can is opened.

Figures 8A, 8B:
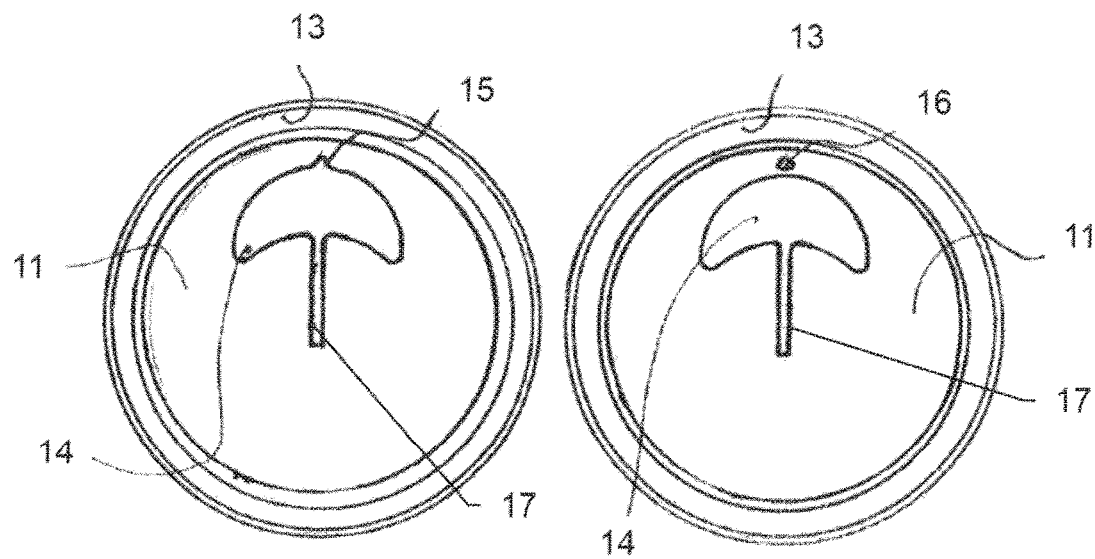
FIGS. 8a-b show a second and a third exemplary embodiment of the can lid.

As second and third exemplary embodiments of the lid 10, FIGS. 8a and 8b respectively show two modifications of the first embodiment of FIGS. 7a and 7b. In FIG. 8a, the drinking orifice 14 comprises a notch 15 opposite the guide slot 17. In FIG. 8b, a small opening 16 is provided next to the drinking orifice 14 opposite the guide slot 17. In this context, the notch 15 and the small opening 16 are each positioned such that they are covered by the closure member 20 (not illustrated here) as long as the can is closed. They may be provided as an alternative or in addition to the notch 23 of the closure member and—particularly with carbonated beverages—allow for gentle equalization of the overpressure within the can when it is being opened. For this purpose, they are preferably arranged on the first axis A since the covering by the closure member is removed there first upon an opening movement of the closure member along said axis.

Figures 9A, 9B:
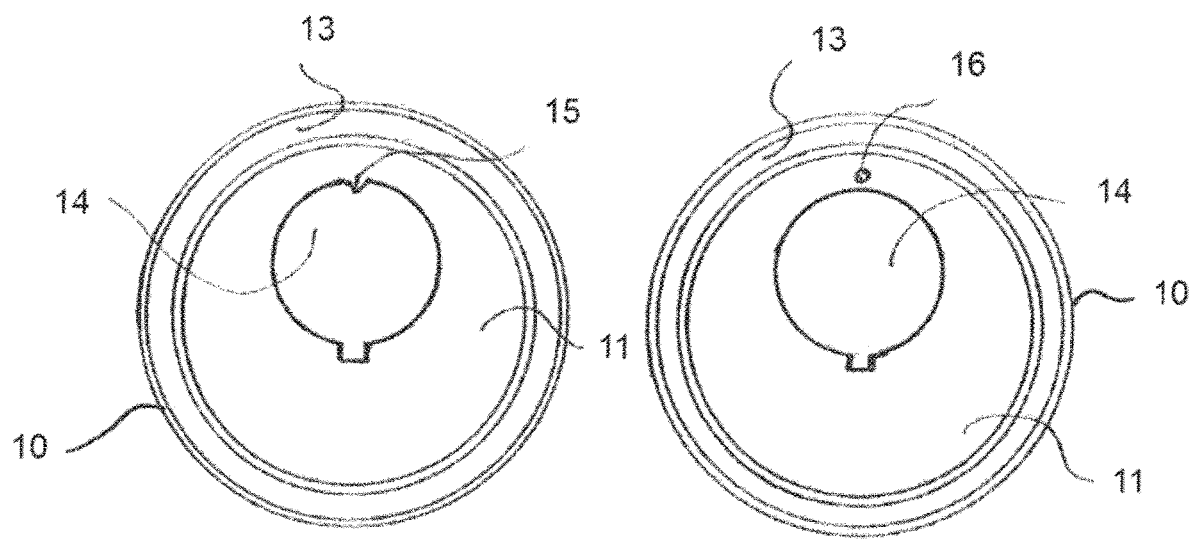
FIGS. 9a-b show further can lids not according to the invention.

In an embodiment that does not form part of the present invention, FIGS. 9a and 9b show a lid 10 according to two modifications of the embodiments shown in FIGS. 8a and 8b with a notch 15 or an opening 16, respectively. In these modifications, the drinking orifice 14 is substantially configured circularly and without a guide slot. However, various other shapes known from the prior art may basically also be used for the drinking orifice.

FIGS. 10a and 10b illustrate the step of opening the can using the closure member 20. In this context, FIG. 10a shows the lid 10 from above with the closure member 20 located therebelow, and FIG. 10b shows the same configuration from below. For the sake of clarity, the operating member 30 is not illustrated here. After an opening movement 8 of the closure member 20 from its closed position below the drinking orifice along the first axis A, the closure member 20 is in a drinking position in which the drinking orifice 14 is exposed and which allows a user to drink or pour out the can contents.

FIG. 10b shows the lower side 22 of the closure member 20 from below in front of the lower side 12 of the can lid 10. After the opening movement 8, the drinking orifice 14 is exposed. The lower side 22 of the closure member 20 comes into contact with the can contents and is correspondingly preferably configured insensitively and in a food safe manner. It may be configured particularly smoothly and flatly. In this exemplary embodiment, the lower side 22 (contrary to the upper side 21) has no features characterized by elevations or recesses.

FIG. 10a shows the upper side 11 of the can lid 10 with folded edge 13 and drinking orifice 14. Beneath is the closure member 20 (illustrated in dashed lines as actually covered by the can lid), which abuts the can lid with its upper side 21 and, by means of an external seal 24, an internal seal 25 as well as a central elevation 27, effects sealing of the part of the lower side of the lid that is respectively covered by the closure member 20. It can be seen that the fixing bolt 28 is guided along the first axis A in the guide slot of the drinking orifice.

FIGS. 11a and 11b illustrate (analogously to FIGS. 10a and 10b) the step of reclosing the lid. In this context, FIG. 11a shows the lid 10 from above with the closure member 20 located therebelow, and FIG. 11b shows the same configuration from below. Also in this case, the operating member 30 is not illustrated for the sake of clarity only. The closure member 20 is in its closed position below the drinking orifice 14 and thus prevents the can contents from leaking. The closure member 20 assumes this position originally as well as after a closing movement 9 by means of which the can may be reclosed again after it has already been open. The closing movement 9 takes place along axis A and opposite the opening movement 8 (cf. FIG. 10a). As can be taken from FIG. 11a, the fixing bolt 28 is positioned at the beginning of the guide slot in the closed position of the closure member 20.

Figure 12A:
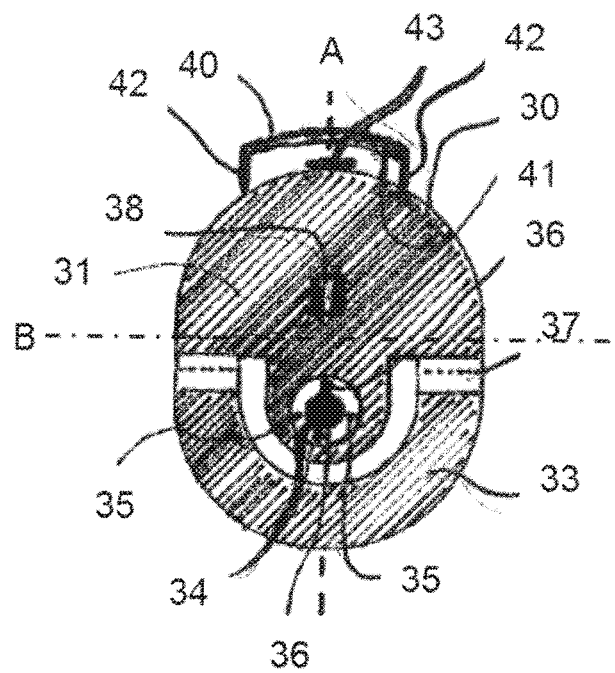
FIGS. 12a-b show a second exemplary embodiment of an operating member as part of the closure system according to the invention.
Figure 12B:
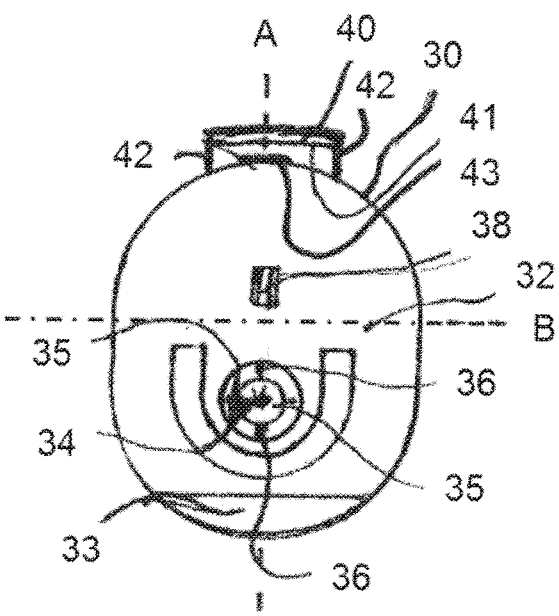

FIGS. 12a and 12b show a second embodiment of the operating member 30 with an alternative embodiment of the control member 40. In this context, FIG. 12a shows the operating member 30 from above, and FIG. 12b shows it from below.

The control member 40 comprises a blocking member 41 which is provided for snapping in at the edge of the lid during assembly of the closure system. For this purpose, the blocking member 41 is attached at the operating member by means of a hinge 43 which enables said snapping. The control member 40 comprises two control bars 42 at the blocking member 41. When the operating member 30 is moved away from the edge of the can lid, said control bars 42 break, due to which an opening of the can remains visible also after it has been reclosed. FIGS. 12a and 12b merely exemplarily illustrate the operating member 30 with the two differently configured control members 34 and 40. Alternatively, the operating member 30 may of course also be provided with only one of the two control members or even with a differently configured control member which serves the same purpose, namely to indicate to a user whether the closure system has already been opened.

FIGS. 13a to 13d illustrate another exemplary embodiment of a closure system according to the invention, wherein the closure system comprises an alternative control member.

Figure 13A:
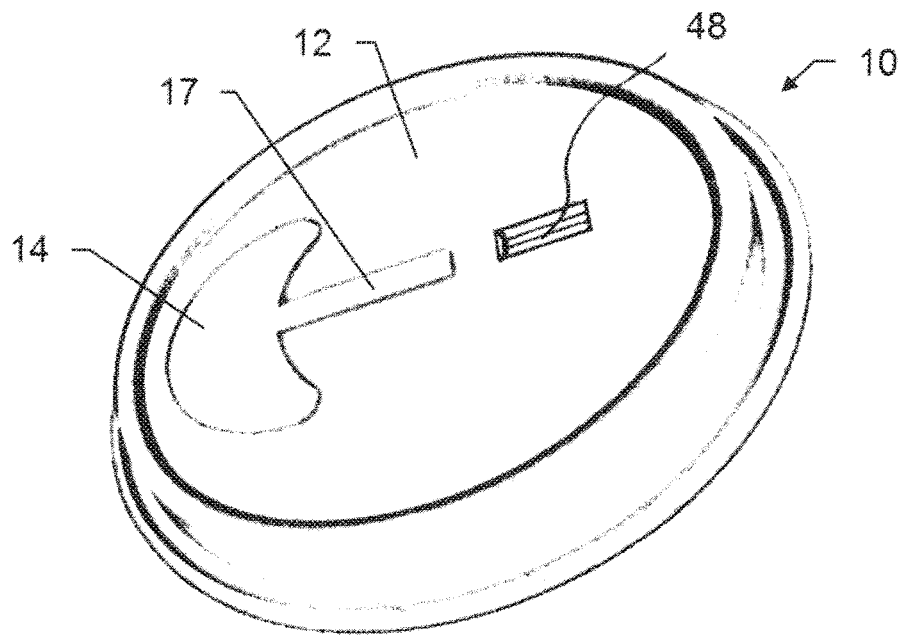
FIGS. 13a-d show a further embodiment of the closure system according to the invention.

FIG. 13a shows the lid 10 of said embodiment of the closure system, which is illustrated from below so that the lower side 12 is visible with the drinking orifice 14 and a guide slot 17. An additional elongate opening 48 is provided in the extension of the guide slot 17.

Figure 13B:
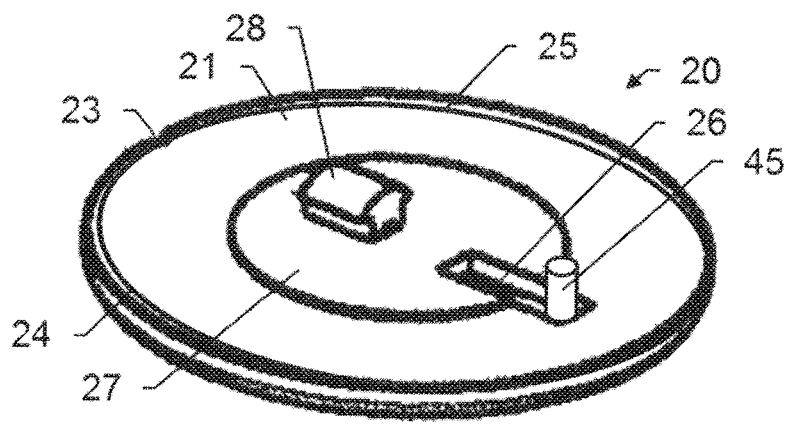

FIG. 13b shows the closure member 20 of this embodiment of the closure system. On the upper side 21, a recess 26 ad a fixing bolt 28 are provided for connection with the operating member 30 (not illustrated here). An external seal 24 and an internal seal 25 serve for sealing off against the lower side of the lid (not illustrated here). Unlike the embodiment illustrated in FIG. 4a, the closure member 20 shown here additionally comprises a control member 45 in the form of a rod. Said control rod 45 is attached at the edge of the recess 26. Rod 45 and recess 26 are dimensioned such that the rod fits into the recess. Although the control rod 45 is illustrated cylindrically in this case, it may be shaped differently as well. For instance, it may particularly be configured conically, in the form of a half cylinder, or as a cuboid. The rod 45 is positioned on the closure member 20 such that it engages the elongate opening 48 of the lid 10 (see FIG. 13a) when the closure member 20 is in the closed position, i.e., in a position in which the closure member 20 covers the drinking orifice 14.

Figure 13C:
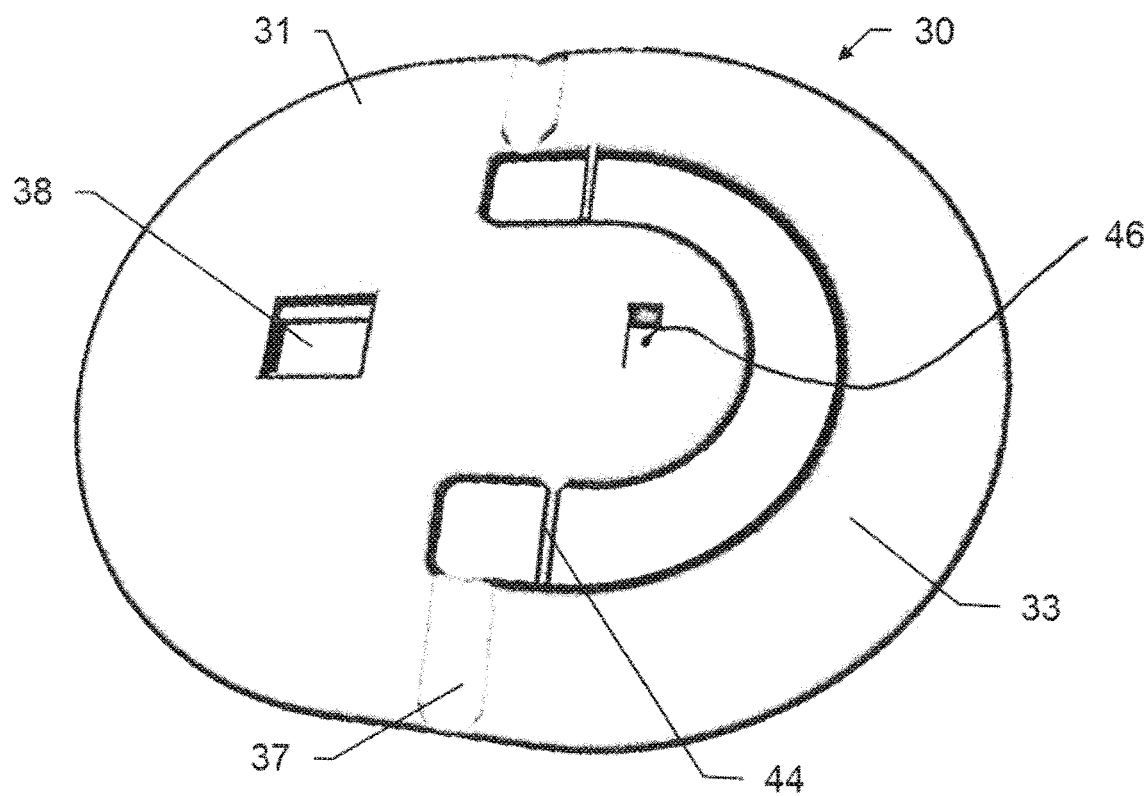
Figure 13D:
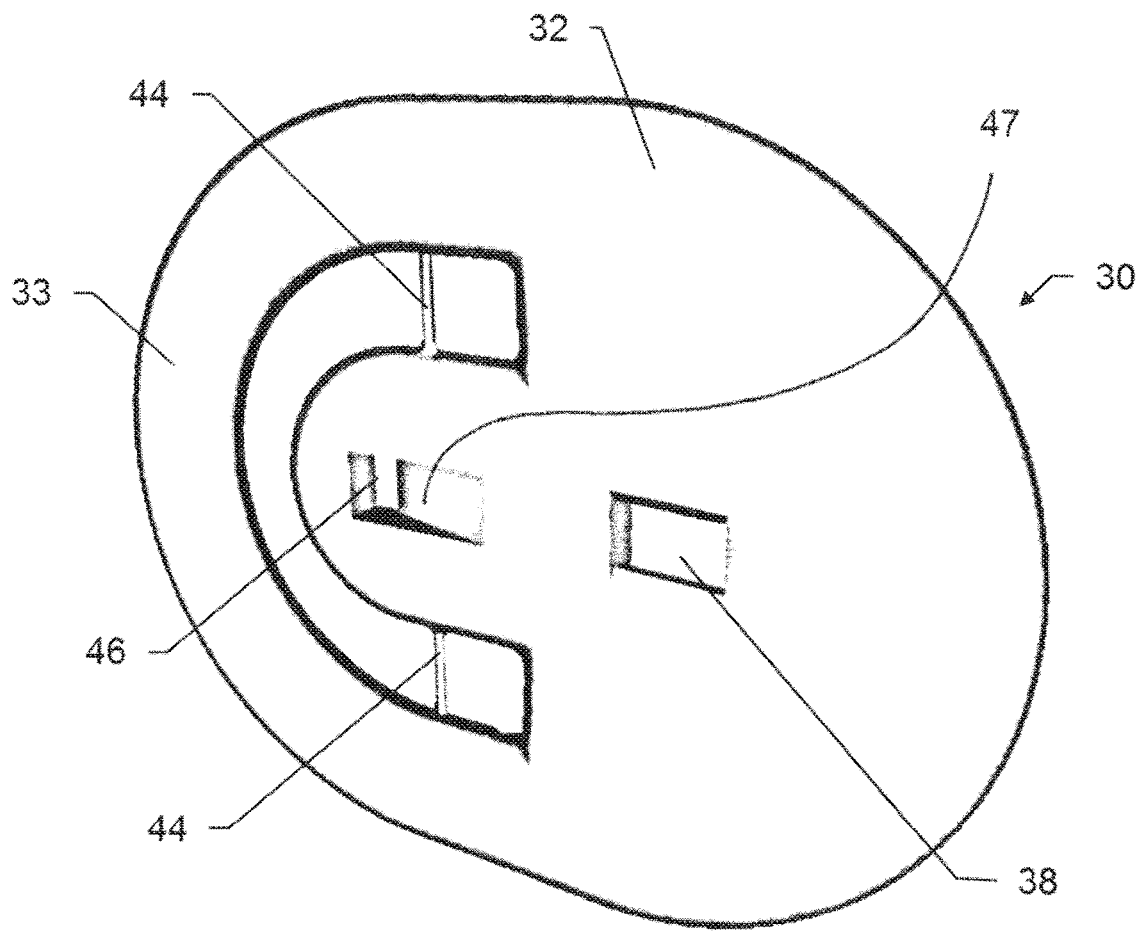

FIGS. 13c and 13d show the operating member 30 of said embodiment of the closure system from above and from below. FIG. 13c shows the upper side 31 of the operating member 30. Unlike the embodiment shown in FIG. 5a, the operating member 30 shown here comprises no control member. Instead, a viewing opening 46 is provided, which is positioned above the control rod 45 of the closure member 20 when the operating member 30 and the closure member 20 are connected to each other—e.g., fixedly connected by means of fixing bolt 28 and cavity 38.

Furthermore, the operating member 30 comprises control bars 44 which connect the main part of the operating member to the handle 33 and are provided to break when the handle 33 is lifted (cf. FIGS. 5*a-c*), thus making irreversibly visible already the step of lifting the handle 33. It goes without saying that this embodiment of the handle 33 may also be combined with the embodiments of the operating member 30 shown beforehand.

FIG. 13*d* shows the lower side 32 of the operating member 30. It shows a chamfered recess 47 at the viewing opening 46, which is positioned above the recess 26 of the closure member 20 if the operating member 30 and the closure member 20 are connected to each other.

The embodiment of the closure system shown in FIGS. 13-*d* comprises an alternative control system in order to render an originally closed can clearly distinguishable from a reclosed one. In this context, the control rod 45 acts as control member. In the originally closed state, the control rod 45 engages through the can opening 48 into the viewing opening 46 in the operating member 30 and is visible there for consumers. Preferably, an upper side of the control rod 45 may be colored in order to enhance visibility. During an opening movement, the control rod 45 strikes the can lid 10 and breaks. The control rod 45 may preferably comprise a predetermined breaking point in order not to break uncontrollably and, should the case arise, block the opening process. The broken control rod 45 is tilted by the chamfered recess 47 in the lower side 32 of the operating member 30 and by the opening movement and comes to rest in the recess 26 on the upper side 22 of the closure member 20. The control rod is thus not visible in the viewing opening. Alternatively, the sides of the control rod 45 may have a different color than the upper side so that the opening may be recognized by the color in the viewing opening 46.

Particularly in this embodiment, the closure member 20 may have an oval or elliptical basic shape in addition to the illustrated round basic shape.

Figure 14A:
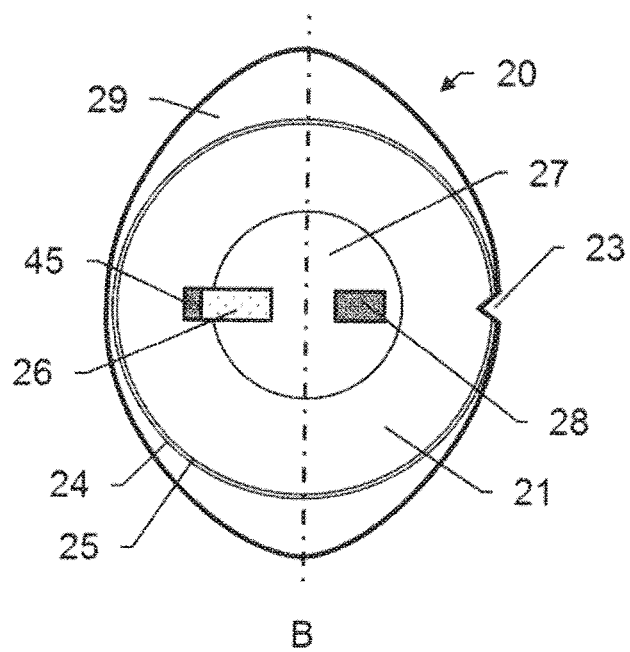
FIGS. 14a-c show a second exemplary embodiment of a closure system.
Figure 14C:
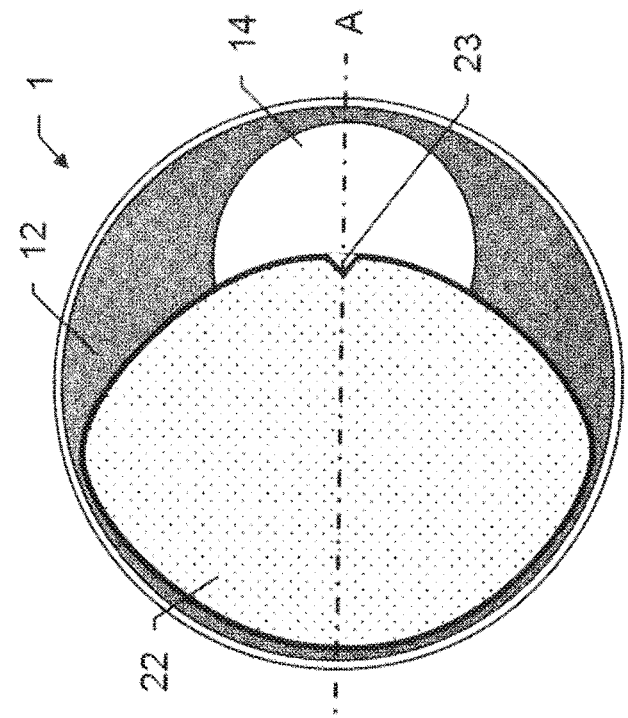
Figure 14B:
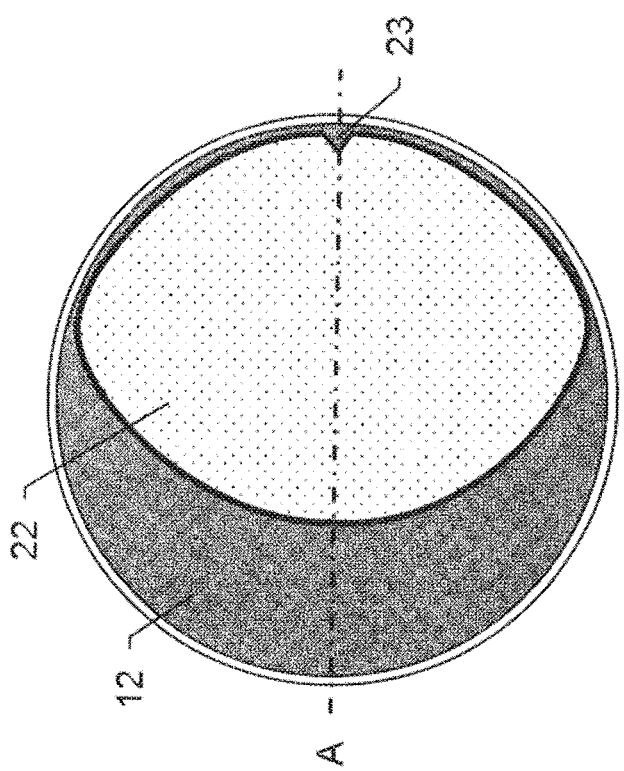

FIGS. 14*a-c* show a second exemplary embodiment of the closure member 20. In FIG. 14*a*, the closure member 20 is illustrated from above so that the upper side 21 with the features arranged thereon (and already shown with respect to FIGS. 4*a-d* and/or FIG. 13*b*) is visible. These features comprise the exterior seal 24 and the interior seal 25 with indentation 23, the recess 26, the central elevation 27, and the fixing bolt 28. In addition, the control rod 45 is part of the closure member 20. In this embodiment, the closure member 20 further comprises a contour region 29 which imparts an overall oval shape to the closure member. The contour region 29 is adjusted to the can lid with respect to form and size. Since the closure member is considerably longer along axis B than along the opening direction orthogonal thereto, an entire opening of the closure system remains ensured. This is illustrated in FIGS. 14*b* and 14*c*. The seals 24 and 25, however, are disposed circularly and enclose a region that is sufficiently large to cover the drinking orifice in the lid entirely. Optionally, a sealing ring (cf. FIG. 3) may be provided at or between the seals 24 and 25.

FIGS. 14*b* and 14*c* show a top view of the closure system 1 with the closure member from FIG. 14*a*. Visible in each case is the lower side 12 of the can lid and the lower side 22 of the closure member. In FIG. 14*b*, the closure member is in the closed position—the drinking orifice is covered entirely. In FIG. 14*c*, the can is open. The closure member has been moved out of the closed position along the first axis A so that the drinking orifice 14 is exposed. In each case, the indentation 23 is illustrated as well, which is disposed at the first axis A and illustrates the first opening below the drinking orifice 14 when the closure member is displaced along the first axis A, thus allowing for particularly gentle equalization of the overpressure present in the interior of the can particularly with carbonated beverages. The shape of the can lid adjusted to the can lid improves the stability of the closure system 1 on the one hand and prevents an excessive opening and/or reclosing movement of the closure system on the other hand.

Figure 15A:
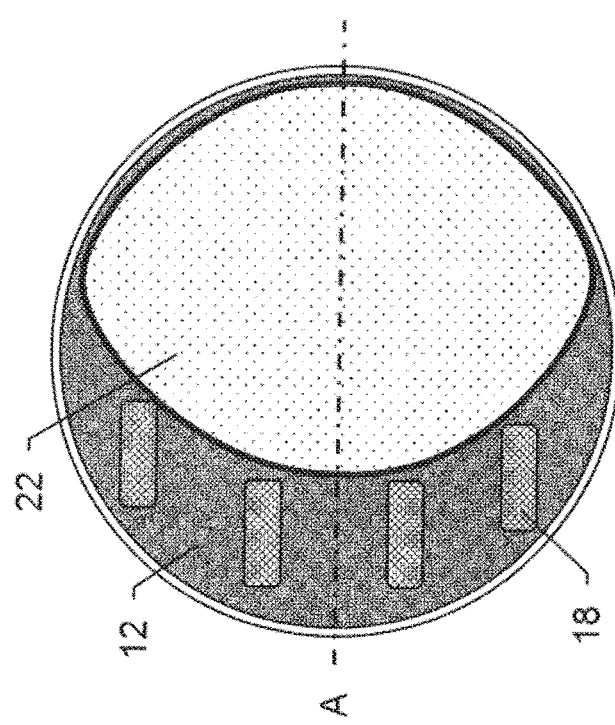
FIGS. 15*a*-*c* show a further exemplary embodiment of the closure system with recesses in the can lid acting as ventilation ducts.
Figure 15B:
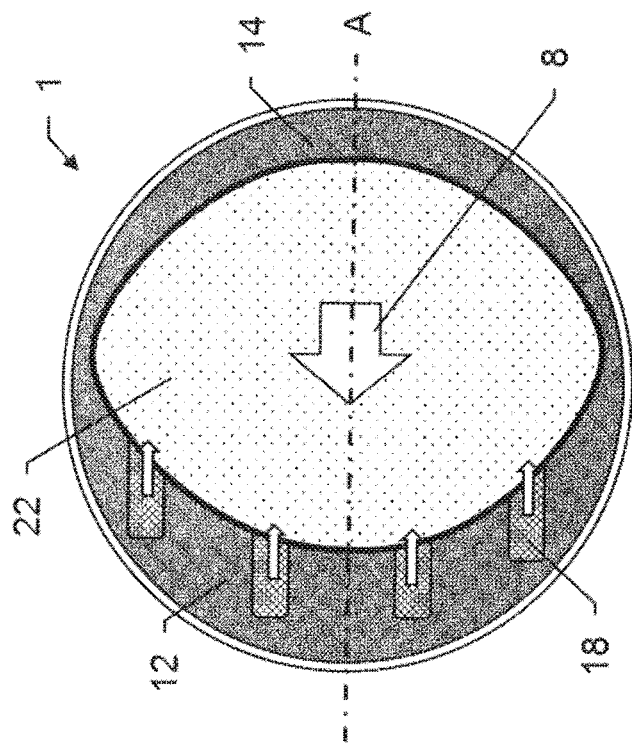
Figure 15C:
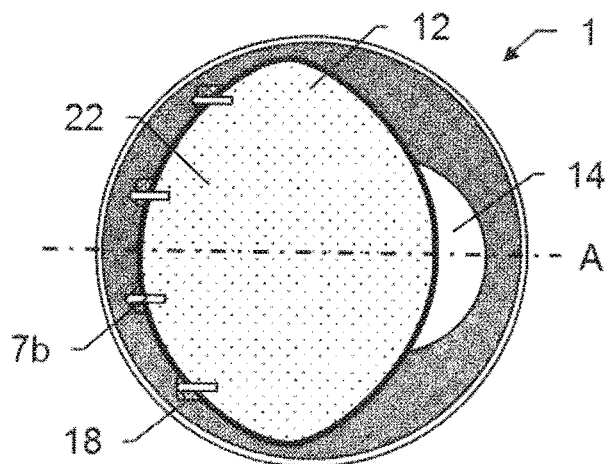

FIGS. 15*a-c* show a further exemplary embodiment of the closure system 1. In each case, the closure system is illustrated from below so that the lower side 12 of the can lid and the lower side 22 of the closure member are visible. In this case, the closure member is the one shown in FIGS. 14*a-c* as a mere example. According to this embodiment, the can lid comprises one or a plurality of recesses 18, which may be configured, e.g., in an elongate manner. Said recesses 18 may be provided in the upper or lower sides of the lid by punching or embossing. These deformations, which may also be configured as grooves or furrows, conduce to increased stability and strength of the lid on the one hand. On the other hand, they may serve for a gas exchange as ventilation ducts so that this embodiment comprises no indentations at the closure member or the drinking orifice. When the container is opened for the first time, air can escape in a controlled manner, and external air can flow into the can during drinking. However, the recesses may also be combined with indentations.

In FIG. 15*a*, the closure member is in the closed position—the drinking orifice is completely covered; the elongate recesses 18 are not affected by the closure member so that neither a gas exchange is possible, nor liquid may escape.

FIG. 15*b* shows the closure member during an opening movement 8 along the first axis A. The drinking orifice is still completely covered, but the closure member has already been under the recesses 18. As soon as the closure member partially overlaps at least one of the recesses 18 with its sealing area, a gas exchange 7*a* may occur between the interior of the can and the environment by means of the not yet covered part of this at least one recess 18 and the still overlapped drinking orifice, wherein the recess serves as a ventilation duct. In this manner, the overpressure present particularly with carbonated beverages may preferably be equalized particularly gently and still before the drinking orifice 14 is opened.

In FIG. 15*c*, the can is completely open. The closure member has been moved out of the closed position along the first axis A so that the drinking orifice 14 is exposed. In this context, the recesses 18 are partially covered by the closure member so that a gas exchange 7*b* between the environment and the interior of the can may not only occur by means of the drinking orifice but also by the recesses 18 which serve as a ventilation duct. In this way, the overpressure created within the can during drinking or pouring out may preferably be equalized. Preferably, this improves the pouring properties. Drinking or pouring out the can contents through the drinking orifice may take place both more even and faster. Since the liquid leaving the can may evenly be replaced by air from the environment via the recesses 18, at least a major part of the drinking orifice 14, particularly the entire drinking orifice 14, is available for liquid flow.

With respect to their dimensions, surface, shape, number and positions, the recesses 18 are preferably configured for ensuring a controlled, optimal gas exchange 7a, 7b between the interior of the can and the environment. An optimization of the configuration of the recesses should preferably take into account a controlled gas outlet 7a that is as gentle as possible, particularly in the case of carbonated beverages, and/or an air inlet 7b into the can that is as strong as possible while the can contents are being drunk or decanted through the drinking orifice 14.

For this purpose, recesses 18 optimized for the outlet 7a may be combined with recesses 18 optimized for the inlet 7b (wherein, however, also one type of recess—for inlet or outlet—may be enough). Recesses optimized for the outlet 7a may particularly be positioned such that they are reached by the closure member and act as a ventilation duct immediately after an opening process has started but are entirely covered by the closure member when fully opened. Recesses optimized for the inlet 7b, however, may be positioned such that they are reached and act as a ventilation duct only when fully opened by the closure member.

Figure 16A:
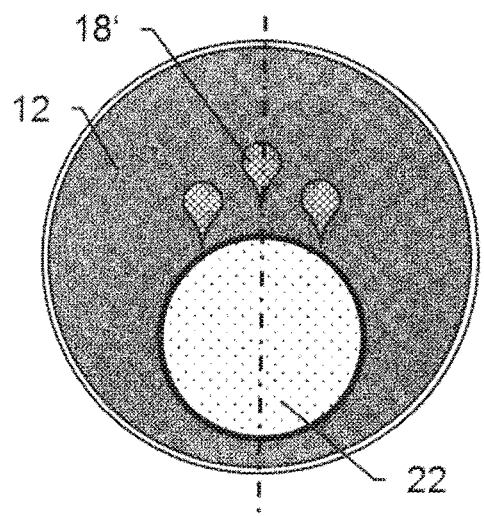
FIGS. 16*a*-*c* show various exemplary embodiments of the recesses.
Figure 16B:
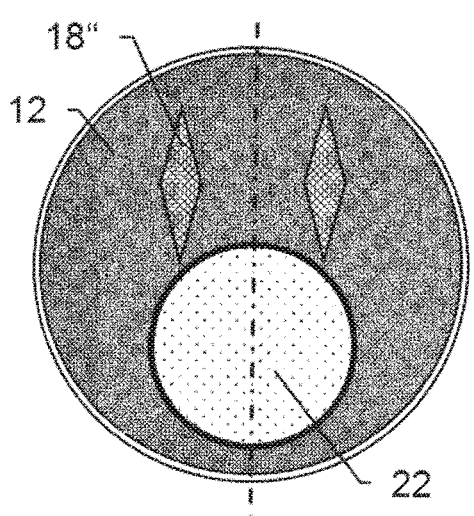
Figure 16C:
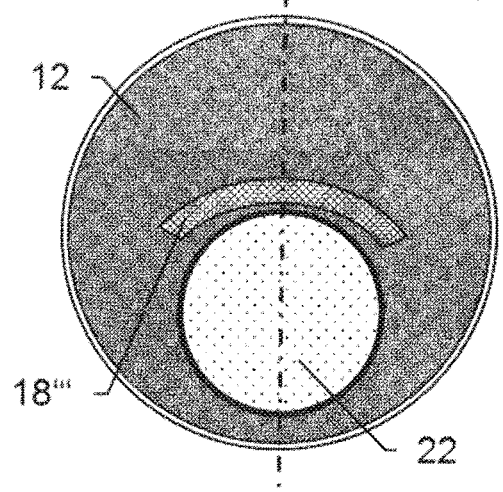

FIGS. 16a-c illustrate various forms and arrangements of the recesses 18', 18", 18'". In this case, the lower side 12 of the can lid is illustrated with the lower side 22 of the closure member as well. Drop-shaped recesses 18', diamond-shaped recesses 18" as well as an arched recess 18—are illustrated merely exemplarily here. Apart from recesses disposed parallel to the opening direction, radial arrangements are possible as well.

Aside from geometric shapes, recesses with more complex patterns may be used, particularly figures, logos or lettering that relate to or provide information about the can contents. For instance, the patterns may contain a trademark of the manufacturer or information about a filling capacity or an expiration date. A combination of such patterns with recess shapes optimized for the gas exchange 7a, 7b is possible as well. Basically, however, the shape and the arrangement of the recess or the recesses may also vary as long as they provide a ventilation duct which bypasses the sealing of the closure member.

Either the lower side 12 of the lid may comprise the one or the plurality of recesses 18, 18', 18", 18'" so that the upper side 11 comprises corresponding elevations, or the one or the plurality of recesses 18, 18', 18", 18'" are present in the upper side 11 of the lid and, correspondingly, one or the plurality of elevated features are present at the lower side 12. In the latter case, the closure member may be configured to be lifted slightly (e.g., up to 1 mm) from the lower side of the lid by the one or the plurality of elevations during an opening movement, so that in each case the gas exchange 7a, 7b occurs through interspaces of the elevations or between the seal and the lower side 12 of the lid.

Figure 17A:
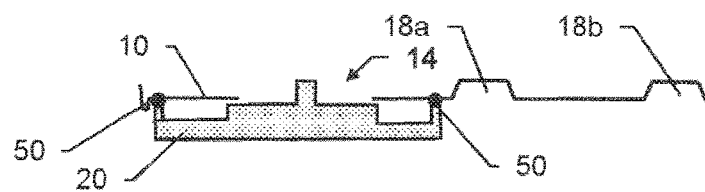
FIGS. 17*a*-*c* show a sectional view of the closure system with recesses for illustrating their function as ventilation ducts.
Figure 17B:
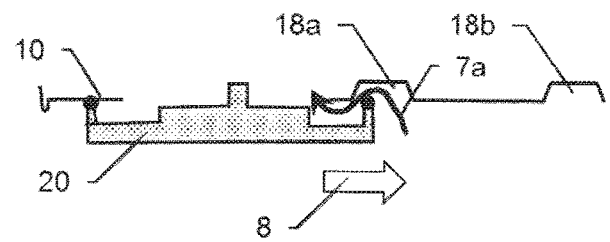
Figure 17C:
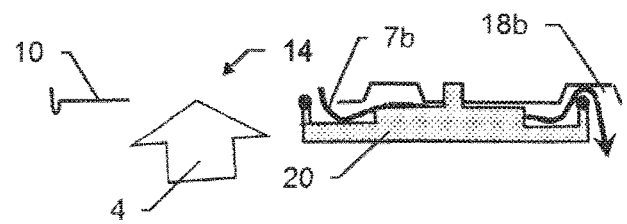

FIGS. 17a-c show a sectional view of an exemplary embodiment of the closure system with recesses in the can lid. Each of these figures shows the lid 10 with the drinking orifice 14 and two recesses 18a and 18b. The recesses are provided in the lower side of the lid, thus representing elevations on the upper side. The closure member 20 is illustrated below the lid, said closure member 20 contacting the lower side of the lid with its sealing ring 50. The closure member is not illustrated here for the sake of clarity.

In FIG. 17a, the closure member 20 is in its closed position below the drinking orifice 14 and covers the same. In this position, the recesses 18a and 18b are not affected by the closure member 20.

FIG. 17b shows a situation in which the opening process has started. The closure member 20 is moved in the opening direction 8 and reaches a first recess 18a resulting in a ventilation duct through which a gas exchange 7a may occur from the interior of the can into the environment so that an overpressure within the can may be relieved or reduced before the closure member 20 uncovers the drinking orifice 14.

FIG. 17c shows the closure system in its open state. The drinking orifice 14 is predominantly exposed, the closure member 20 overlaps only a small part of the opening 14—this part may, e.g., also be a guide slot of the drinking orifice (see, e.g., FIG. 7a,b). The closure member covers a second recess 18b, thus creating a ventilation duct. If the liquid can contents are drunk or emptied—particularly by tilting the can—they flow out of the can through the drinking orifice 14 (illustrated by arrow 4) following the force of gravity. In this way, an underpressure may form within the can, which may adversely reduce the flow speed. However, a gas inlet 7b into the can may occur, which may serve for an advantageous equalization of the underpressure.

Preferably, the first recess 18a is configured for an optimal gas outlet 7a with respect to its dimensioning, shape, position, orientation, and surface structure. In addition, the recess 18b is preferably configured for an optimal gas inlet 7b with respect to its dimensioning, shape, position, orientation, and surface structure. Alternatively, a recess comprising the features which allow for both a gas outlet 7a and a gas inlet 7b as desired may of course be used as well.

The closure member 20 may preferably comprise recesses corresponding to the recesses in the lid, wherein the recesses form differently configured ventilation ducts depending on the position of the closure member 20 in order to guide the gas exchange 7a,b as optimal as possible. Furthermore, the operating member is preferably configured such that the gas exchange 7a,b is not obstructed, or it is configured such that the gas exchange 7a,b is furthered and takes place as controlled as possible. In this way, the operating member may also comprise ventilation ducts and/or form ventilation ducts together with the closure member 20. For instance, a gas outlet 7a into the environment may thus be target-oriented, particularly directed away from a user, e.g., orthogonally to the opening direction. The closure member 20 and the operating member may also be configured to absorb an overpressure from the interior of the can and to uncover it to the environment in a controlled manner.

Optionally, the opening process may be delayed by one or a plurality of mechanical resistances (not illustrated here) if the closure member is located at a determined position in order to arrange the gas outlet 7a optimally. For instance, these resistances may be configured as elevations in the lid which the operating member or the closure member hits during the opening process. The resistance(s) may particularly also be created by a control member (cf. FIGS. 5a, 12a, 13b) by means of which a first opening of the closure may be identified by a user.

The resistances may lead to a slight delay in the opening process at a determined position, which may be selected such that a certain amount of gas may escape before the drinking orifice 14 is opened. However, the resistances may also create a significant resistance for a user opening the closure. In this case, the user may await a ventilation of the can, particularly a complete relief of the overpressure, until they continue the opening process.

Optionally, a ventilation duct in the closure member or the operating member may be configured such that the gas outlet 7a causes an acoustic signal, e.g., in the form of a whistle or pipe. For instance, the user may identify on the basis of the sound intensity whether an overpressure is still present in the can, and continue the opening process dependent thereon.

Figure 18:
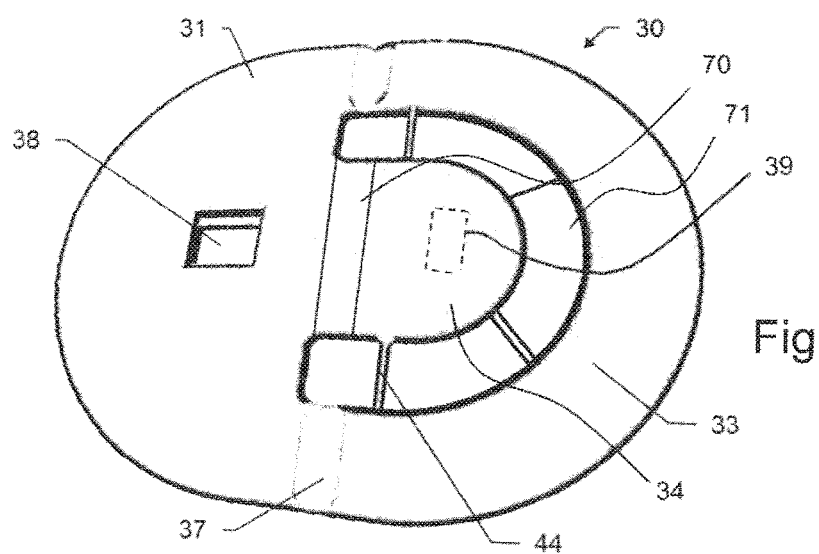
FIG. 18 shows a further exemplary embodiment of an operating member.

FIG. 18 shows a further exemplary embodiment of an operating member 30 which may be combined with the closure members 20 described beforehand.

In this case, a securing and/or control member 34 is connected to the remaining operating member 30 by means of a hinge 70, particularly to the portion of the operating member 30 at which the connection with the closure member is provided (in this case, the region in which the cavity 38 is provided for receiving the fixing bolt 28; instead of the cavity 38, however, different types of connections may also be selected, as described above). Optionally, the securing and/or control member 34 is connected to the handle 33, e.g., fixedly connected (e.g., by a rigid portion 71) or by one or a plurality of crossbars 44 which break if the handle 33 is lifted.

On the lower side of the securing and/or control element 34, an elevation 39 is preferably provided (indicated, since concealed, by a dashed line), which may particularly be configured as a hook.

Figure 19:
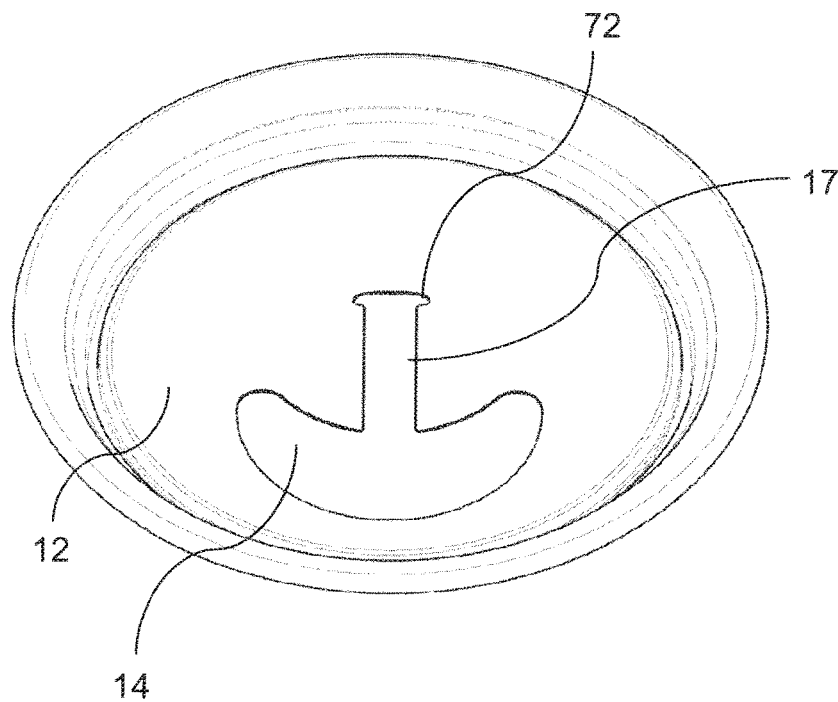
FIG. 19 shows a lid with optional relief indentations.

FIG. 19 shows another optional feature of a lid 12 for use with the closure system. As shown here, the guide slot 17 may comprise at least one or a plurality of relief notches 72 at its end facing away from the drinking orifice 14. The averted end may be a rear end of the guide slot 17. The relief notches 72 may form a radius in corners of an otherwise rectangular cross-section of the guide slot 17. For example, the relief notches 72 may be punched out such that this end of the guide slot 17 does not have a right angle. This can prevent cracking of the lid 12 and/or bursting of the lid 12 at high internal pressures.

The one or the plurality of relief notches 72 preferably extend substantially perpendicular to the longitudinal direction of the guide slot 17. The respective relief notch 72 is preferably curved, wherein a center of the circle of curvature is preferably closer to the center of the lid 12 than the relief notch 72. The respective relief notch 72 may, for example, be arcuate. A length of the relief notch 72, in particular an arcuate length, may be greater than the width of the guide slot 17 perpendicular to the longitudinal axis thereof. As will be readily apparent to those skilled in the art, such relief notches 72 may be used with any of the lid 12 described above.

Figure 20:
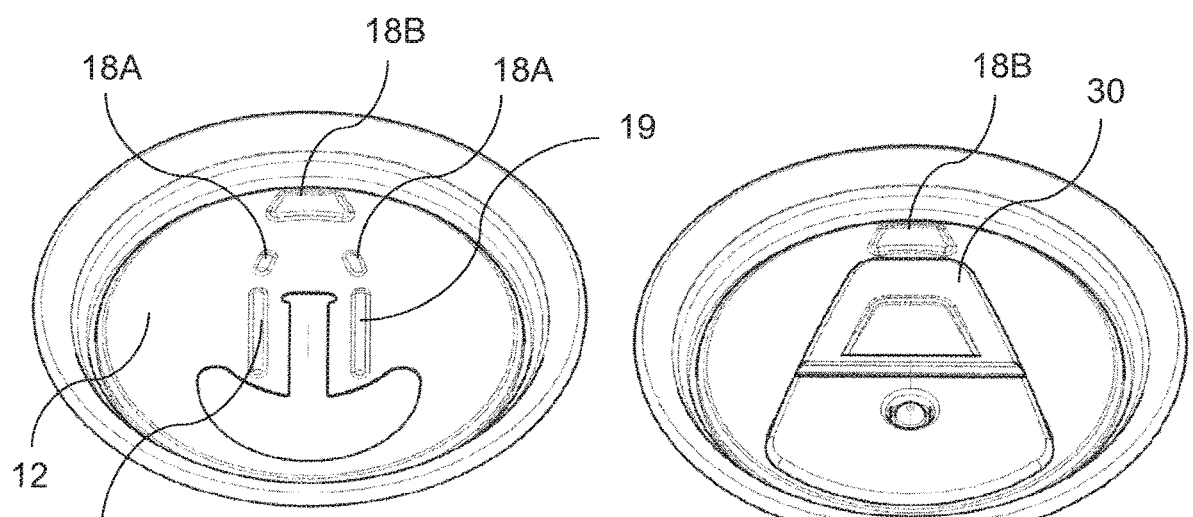
FIG. 20 shows a further embodiment of a lid for use with the closure system.
Figure 22:
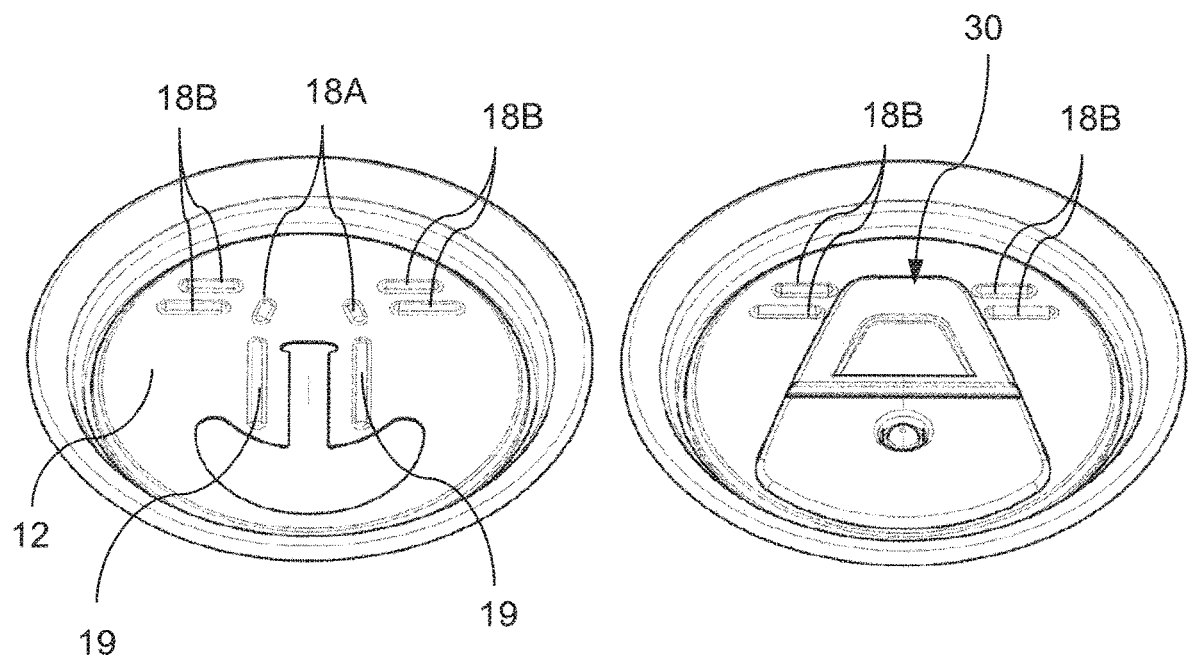
FIG. 22 shows a further embodiment of a lid for use with the closure system.

FIGS. 20 and 22 show further optional features and embodiments of the lid 12 which may be used in combination with or independently of the relief notches. In this regard, the lid comprises at least one first recess 18A or a plurality of recesses 18A that can form a first air duct during opening of the closure member 20 and/or in its open position, as described above.

The at least one first recess 18A is preferably arranged to be located within the seal (not shown in FIGS. 20 and 22; see the sealing ring 50 in FIGS. 17a to 17c) in the closed position of the closure member 20.

The at least one first recess 18A is preferably arranged to be covered by the closure member 20 (not shown in FIGS. 20 and 22) and/or the operating member 30 in the closed position, preferably entirely.

When the closure member 20 is moved into the open position, a position, in particular an intermediate position, is preferably achieved in which the seal 50 and/or the closure member 20 partially overlaps the at least one first recess 18A. In this way, a pressure compensation may be achieved, in particular an initial pressure compensation when opening the closure system. The at least one first recess 18A may be arranged such that, in the open position, it is completely overlapped by the closure member 20 and/or is arranged completely within the seal 50.

In combination with or independently of the at least one first recess 18A, the lid 12 may comprise at least one second recess 18B, which is preferably arranged such that it is not covered by the closure member 20 in the closed position and/or is not arranged within the seal 50 in the closed position, not even partially. Preferably, the at least one second recess 18B is not covered by the operating member 30 in the closed position. In the open position, the at least one second recess is preferably partially (in particular only partially) overlapped by the closure member 20 and/or the seal 50 and/or the operating member 30.

The second recess may be configured, for example, as one or a plurality of recesses 18B arranged behind the operating member 30 in the direction of displacement of the operating member 30 (see FIG. 20) and/or next to the operating member 30 (see FIG. 22).

As described above, the at least one first recess 18A and/or the at least one second recess 18B may protrude upwardly or downwardly. The at least one first recess 18A and/or the at least one second recess 18B may particularly be configured as an embossment.

Figure 21:
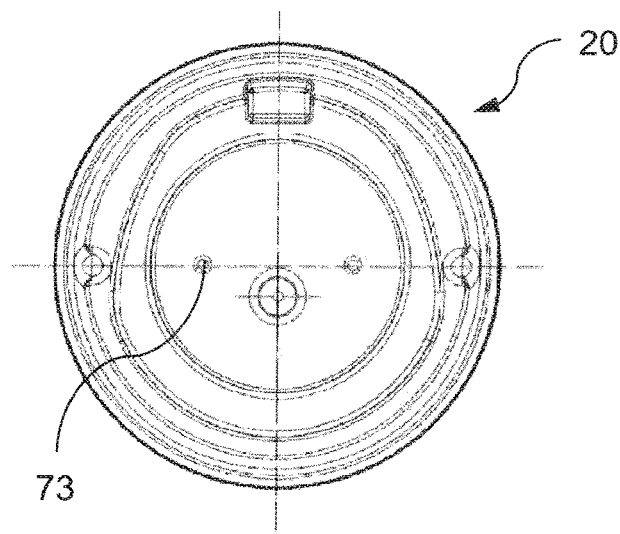
FIG. 21 shows a possible embodiment of a closure member for use with the lid of FIG. 20.

In combination with or independently of the at least one first recess 18A and/or the at least one second recess 18B, the lid 12 may further comprise one or a plurality of (in particular two) third recesses 19, which may cooperate with one or more corresponding protrusions 73 on the upper surface of the closure member 20 (see FIG. 21) to provide a longitudinal guide and/or distortion lock for the closure member 20. In this respect, the recess 19 preferably protrudes upwardly. It may be configured as an embossment in the lid 12.

It goes without saying that the shown figures shown are only schematic representations of possible exemplary embodiments. The various approaches may likewise be combined with each other and with prior art devices, such as beverage containers.

Although particularly a can and a can lid are described above, the disclosed closure system may also be attached to other containers for liquids or bulk materials. Such liquid containers may be made, e.g., of cardboard, plastic and/or metal. This particularly applies to containers which, at least in the region of a pouring orifice, are made of a material which has sufficient rigidity. In the case of a liquid container, the lid mentioned herein may be replaced, e.g., by a wall of the container and/or be formed by such a wall.

The invention relates to, inter alia, the following aspects:
1. A closure system (1) for a container for liquids (particularly beverages) and/or bulk material, particularly a beverage can (2) and/or a cardboard box, comprising
   a closure member (20) for closing a drinking orifice (14) of a lid (10) of the beverage container, and
   an operating member (30) for manually opening the drinking orifice (14) by a user, characterized in that
   the closure member (20) may be positioned at a lower side (12) of the lid (10) and fixedly connected with the operating member (30) at the upper side (11) of the lid (10);
   the operating member (30) and the closure member (20) are movably disposable along a first axis (A) which extends substantially parallel to the upper side (11) of the lid (10), wherein
      moving of the operating member (30) into a first direction (8) along the first axis (A) can cause a movement of the closure member (20) from the closed position and opening of the drinking orifice (14), and moving of the operating member (30) into a second direction (9) opposite the first direction (8) along the first axis (A) can cause a movement of the closure member (20) into the closed position and a reclosure of the drinking orifice (14).

2. The closure system (1) according to aspect 1, comprising the lid (10), wherein the lid comprises an upper side (11), a lower side (12) and the drinking orifice (14), characterized in that the closure member (20) is positioned at the lower side (12) of the lid (10) and fixedly connected with the operating member (30) at the upper side (11) of the lid (10); and the operating member (30) and the closure member (20) are movably disposed along the first axis (A), wherein moving of the operating member (30) into a first direction (8) along the first axis (A) can cause a movement of the closure member (20) from the closed position and an opening of the drinking orifice (14), and moving of the operating member (30) into a second direction (9) opposite the first direction (8) along the first axis (A) can cause a movement of the closure member (20) into the closed position and a reclosure of the drinking orifice (14).

3. The closure system according to aspect 1 or aspect 2, characterized in that the closure system comprises at least one control member (34, 40, 45), wherein the control member is configured such that it comprises a first state as long as the operating member (30) is not moved and/or the closure member (20) is not moved from the closed position, and irreversibly assumes a second state, which is at least optically distinguishable from the first state, if the operating member (30) is moved into the first direction (8) and/or if the closure member (20) is moved from the closed position, particularly wherein the control member (34, 40, 45) retains the second state even if the operating member (30) is moved back into the second direction (9) and/or the closure member (20) is moved back into the closed position; and/or the operating member (30) is configured integrally with the control member (34), particularly wherein the operating member (30) and the control member (34) are made of aluminum.

4. The closure system according to aspect 3, characterized in that the control member (34, 40) comprises at least one control bar (36, 42) attached such that it is visible from the outside, said control bar (36, 42) being disposed and configured such that it breaks when the operating member (30) is moved into the first direction (8) and/or the closure member (20) is moved from the closed position, particularly wherein the at least one control bar (36, 42) comprises a predetermined breaking point.

5. The closure system according to aspect 4, characterized in that the control member (34) is disposed and configured such that the movement of the operating member (30) in the first direction (8) causes a diverting movement (5, 6) of the control member (34), thus causing breaking of the at least one control bar (36), particularly wherein the control member (34) is attached to the operating member (30) by means of two crossbars (35) which guarantee movability of the control member (34) about a tilting axis (C) orthogonal to the first axis (A), the at least one control bar (36) extends along the first axis (A), particularly wherein the at least one control bar (36) is attached to the control member (34) and the operating member (30), the control member (34) is arranged such that it collides with the lid (10) if the operating member (30) is moved in the first direction (8), wherein the diverting movement (5, 6) is at least partially caused by the collision, and the diverting movement involves tilting (6) of the control member (34) about the tilting axis (C);

particularly wherein at its lower side the control member (34) comprises an elevation (39) which is disposed such that it collides with the lid (10) if the operating member (30) is moved in the first direction (8), particularly wherein the diverting movement (5, 6) is at least partially caused by the collision, the elevation (39) abuts the lid (10) at the edge of the drinking orifice (14) or at the end of a guide slot (17) of the drinking orifice (14); and/or the closure member (20) comprises a recess (26), wherein the elevation (39) extends into the recess (26).

6. The closure system according to aspect 3, characterized in that the control member (45) is provided at the closure member (20) and engages an opening (48) of the lid (10) in the first state and is visible through a viewing opening (46) of the operating member (30), particularly wherein the control member (45) is configured and positioned relative to the opening (48) of the lid (10) that the control member (45) breaks if the operating member (30) is moved into the first direction (8), and/or the closure member (20) is moved from the closed position.

7. The closure system according to any one of the preceding aspects, characterized in that the drinking orifice (14) comprises a guide slot (17) which extends along the first axis (A), and the operating member (30) and/or the closure member (20) comprise a guide member which engages the guide slot so that the operating member (8) is movably along the first axis (A) only, particularly wherein the guide member fixedly connects the operating member (30) and the closure member (20).

8. The closure system according to any one of the preceding aspects, characterized in that the closure member (20) comprises at least one notch (23), wherein the at least one notch (23) is disposed such that opening of the drinking orifice

(14) is initially caused by the notch (23) if the closure member (20) is moved from the closed position, particularly wherein the notch (23) is disposed to be positioned on the first axis (A) if the closure member (20) is in the closed position; and/or on the first axis (A) the lid (10) comprises a notch (15) or opening (16), and the closure member is configured to cover the notch (15) or opening (16) in the closed position, wherein the notch (15) or opening (16) is arranged at or next to the drinking orifice (14) such that a movement of the closure member (20) from the closed position causes opening of the notch (15) or opening (16) prior to the drinking orifice (14).

9. The closure system according to any one of the preceding aspects,
characterized in that
the lid (10) comprises at least one recess (18, 18', 18", 18'") which is disposed relative to the closed position of the closure member (20) such that the at least one recess (18, 18', 18", 18'") is at least partially overlapped by the closure member (20) when the closure member (20) is moved from the closed position, particularly in the first direction (8), particularly wherein the recess is embossed or punched into the upper side (11) or the lower side (12) of the lid (10),
wherein the at least one recess (18, 18', 18", 18'") is disposed and the closure member (20) is dimensioned such that,
prior to opening the drinking orifice (14), the at least one recess (18, 18', 18", 18'") is at least partially overlapped by the closure member (20) when the closure member (20) is moved from the closed position, and
a gas exchange (7a, 7b), particularly for compensating an overpressure and/or underpressure within the beverage container, is allowed for if the at least one recess (18, 18', 18", 18'") is partially overlapped by the closure member (20), particularly if the drinking orifice (14) is entirely or partially covered by the closure member (20) at the same time.

10. The closure system according to aspect 9,
characterized in that
the at least one recess (18, 18', 18", 18'") is provided in the upper side (12) of the lid (10) such that an elevation corresponding to the recess is present at the lower side (12) of the lid (10), wherein the closure member (20) is distanced from the lower side (12) of the lid (10) by the elevation when the at least one recess (18, 18', 18", 18'") is overlapped, and the gas exchange (7a, 7b) takes place bypassing the at least one elevation.

11. The closure system according to any one of the preceding aspects,
characterized in that
the operating member (30) and the closure member (20) are made of aluminum, particularly wherein a fixed connection of the closure member (20) and the operating member (30) is achieved by a welded joint and/or a snap-in connection; or
the operating member (30) and/or the closure member (20) is made of a plastic material, particularly wherein the operating member (30) and the closure member (20) are made of the same plastic material, and/or a fixed connection of the closure member (20) and the operating member (30) is achieved by an adhesive joint and/or a snap-in connection.

12. The closure system according to any one of the preceding aspects,
characterized in that
the closure member (20) comprises a fixing bolt (28) and the operating member (30) comprises a cavity (38), wherein the fixing bolt is inserted into the cavity for fixedly connecting the closure member (20) and the operating member (30), particularly wherein the fixing bolt (28)
comprises barbs for snapping in at the operating member (30), and/or
the fixing bolt (28) engages a guide slot (17) of the drinking orifice (14), said guide slot (17) extending along the first axis (A).

13. The closure system according to any one of the preceding aspects,
characterized in that
the operating member (30) comprises a handle (33) abutting the lid of the can, wherein the handle (33) is configured in a chamfered manner on the lower side, and
may be raised by at least 45°, particularly at least 90°, by means of a swiveling movement (7) about a swivel axis orthogonal to the first axis (A),
particularly wherein
the swivel movement (7) takes place in the direction of the second direction (9),
the operating member (30) is configured integrally with the handle (33), wherein a notch (37) acting as a hinge extends along the swivel axis, and/or
the handle (33) is configured semi-annularly.

14. The closure system according to any one of the preceding aspects,
characterized in that
the closure member (20) is adjusted to a shape of the lid (10) with respect to its outer shape,
particularly wherein the closure member (20) is oval or elliptical and comprises a length that is greater along a second axis (B) orthogonal to the first axis (A) than along the first axis (A).

15. A beverage can (2) comprising a cylindrical body for receiving liquids, particularly
carbonated liquids,
characterized by
a closure system (1) according to any one of the preceding aspects.

Although the present invention has been described with reference to preferred embodiments, workers skilled in the art will recognize that changes may be made in form and detail without departing from the spirit and scope of the invention.

The invention claimed is:

1. A closure system for a container for liquids or bulk material, the closure system comprising:
a lid, wherein the lid comprises an upper side, a lower side and a drinking orifice;
a closure member for closing the drinking orifice, the closure member being positioned at a lower side of the lid and configured to cover an entire surface of the drinking orifice in a closed position;
an operating member for manually opening the drinking orifice by a user, the operating member being positioned at the upper side of the lid and connected to the closure member; and at least one recess defined in the lid and disposed relative to the closure member such that, when the closure member is moved from the closed position via the operating member, the at least one recess is at least partially overlapped by the closure member such that a gas exchange occurs between an interior of the container and an environment.

2. The closure system according to claim 1, wherein the at least one recess is at least partially overlapped by the closure member while the drinking orifice is still completely covered by the closure member.

3. The closure system according to claim 1, wherein the operating member and the closure member are disposed movably along a first axis which extends substantially parallel to the upper side of the lid, wherein:
   moving of the operating member in a first direction along the first axis causes a movement of the closure member from the closed position and an opening of the drinking orifice, and
   moving of the operating member into a second direction opposite the first direction along the first axis causes a movement of the closure member into the closed position and a reclosure of the drinking orifice.

4. The closure system according to claim 1, wherein the closure system comprises at least one control member, wherein on its lower side the control member comprises an elevation which is arranged such that it collides with the lid when the operating member is moved or when the closure member is moved from the closed position.

5. The closure system according to claim 4, wherein the control member is connected with the operating member via an integral hinge, wherein the integral hinge defines a tilting axis which is orthogonal to a first axis along which the operating member is movable.

6. The closure system according to claim 1, wherein the drinking orifice comprises a guide slot.

7. The closure system according to claim 6, wherein the closure system comprises at least one control member, wherein on its lower side the control member comprises an elevation which is arranged such that it collides with an end of the guide slot when the operating member is moved or when the closure member is moved from the closed position.

8. The closure system according to claim 6, wherein
   the guide slot extends along a first axis, and
   the operating member or the closure member comprises a guide member engaging the guide slot so that the operating member is movable along the first axis only.

9. The closure system according to claim 8, wherein the guide member fixedly connects the operating member and the closure member.

10. The closure system according to claim 1, wherein a fixed connection of the closure member and the operating member is achieved by a welded joint, an adhesive joint or a rivet joint.

11. The closure system according to claim 1, wherein the closure system comprises at least one control member, wherein the control member is configured such that it comprises a first state as long as the operating member is not moved or the closure member is not moved from the closed position, and irreversibly assumes a second state, which is at least optically distinguishable from the first state, when the operating member is moved in a first direction or the closure member is moved from the closed position, wherein the control member retains the second state even when the operating member is moved to reclose the drinking orifice back or the closure member is moved back into the closed position.

12. The closure system according to claim 11, wherein the operating member is configured integrally with the control member.

13. The closure system according to claim 12, wherein the operating member and the control member are made of aluminum.

14. The closure system according to claim 12, wherein the operating member and the control member are made of a plastic material.

15. The closure system according to claim 11, wherein the control member comprises at least one control bar attached such that it is visible from the outside, said control bar being disposed and configured such that it breaks when the operating member is moved in the first direction or the closure member is moved from the closed position, wherein the at least one control bar comprises a predetermined breaking point.

16. The closure system according to claim 15, wherein the control member is disposed and configured such that the movement of the operating member in the first direction causes a diverting movement of the control member, thus causing breaking of the at least one control bar, wherein
   the control member is attached to the operating member movable about a tilting axis orthogonal to a first axis along which the operating member is movable,
   the at least one control bar is attached to the control member and the operating member,
   the control member is arranged such that it collides with the lid if the operating member is moved in the first direction, wherein the diverting movement is at least partially caused by the collision, and
   the diverting movement involves tilting of the control member about the tilting axis;
   wherein at its lower side the control member comprises an elevation which is disposed such that it collides with the lid when the operating member is moved in the first direction, wherein
      the diverting movement is at least partially caused by the collision, and
      the elevation abuts the lid at an edge of the drinking orifice or an end of a guide slot of the drinking orifice.

17. The closure system according to claim 1, wherein the gas exchange occurs through the at least one recess.

18. The closure system according to claim 1, wherein when the closure member is moved from the closed position, the at least one recess is partially overlapped by the closure member and the drinking orifice is at least partially overlapped by the closure member at the same time.

19. The closure system according to claim 1, wherein
   the closure member comprises at least one indentation, wherein the at least one indentation is arranged such that, during a movement of the closure member from the closed position, opening of the drinking orifice initially occurs by the indentation.

20. The closure system according to claim 1, wherein the at least one recess is embossed or punched into the upper side or the lower side of the lid.

21. The closure system according to claim 1, wherein the at least one recess is provided in the lower side of the lid.

22. The closure system according to claim 1, wherein the operating member and the closure member are made of aluminum.

23. The closure system according to claim 1, wherein the gas exchange equalizes an overpressure or an underpressure within the container.

24. The closure system according to claim 1, wherein in an open position of the closure member in which the drinking orifice is at least partially uncovered by the closure member, the at least one recess is completely overlapped by the closure member.

25. The closure system according to claim 1, wherein the operating member and the closure member are made of a plastic material.

26. The closure system according to claim 1, wherein when the closure member is moved from the closed position, a sealing area of the closure member partially overlaps the at least one recess.

27. The closure system according to claim 1, wherein the closure member comprises a fixing bolt and the operating member comprises a cavity, wherein the fixing bolt is inserted into the cavity for fixedly connecting the closure member and the operating member, and wherein the fixing bolt engages a guide slot of the drinking orifice, said guide slot extending along a first axis along which the operating member is movable.

28. The closure system according to claim 1, wherein the operating member comprises a handle abutting the lid of the container, and wherein the handle may be raised by at least 45° by means of a swiveling movement about a swivel axis orthogonal to a first axis along which the operating member is movable.

29. The closure system according to claim 28, wherein the operating member is configured integrally with the handle as a single monolithic piece.

30. The closure system according to claim 28, wherein a notch acting as a hinge extends along the swivel axis.

31. The closure system according to claim 1, wherein the lid comprises an indentation or an orifice, and the closure member is configured to cover the indentation or orifice in the closed position, wherein the indentation or orifice is disposed at or next to the drinking orifice such that the indentation or orifice is opened prior to the drinking orifice during a movement of the closure member from the closed position.

32. The closure system according to claim 1, wherein the at least one recess is provided in the upper side of the lid such that an elevation corresponding to the recess is present at the lower side of the lid, wherein the closure member is distanced from the lower side of the lid by the elevation when the at least one recess is overlapped, and the gas exchange takes place by bypassing the elevation.

33. A beverage can comprising a cylindrical body for receiving liquids, and further comprising
a closure system according to claim 1.

* * * * *